US008999132B2

(12) United States Patent
Bazant et al.

(10) Patent No.: US 8,999,132 B2
(45) Date of Patent: Apr. 7, 2015

(54) DESALINATION AND PURIFICATION SYSTEM

(71) Applicant: Massachusetts Institute of Technology, Cambridge, MA (US)

(72) Inventors: Martin Zdenek Bazant, Wellesley, MA (US); EthelMae Victoria Dydek, Cambridge, MA (US); Daosheng Deng, Cambridge, MA (US); Ali Mani, Palo Alto, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/325,423

(22) Filed: Jul. 8, 2014

(65) Prior Publication Data

US 2014/0318972 A1    Oct. 30, 2014

Related U.S. Application Data

(62) Division of application No. 13/165,042, filed on Jun. 21, 2011, now Pat. No. 8,801,910.

(60) Provisional application No. 61/356,769, filed on Jun. 21, 2010.

(51) Int. Cl.
*B01D 61/48* (2006.01)
*C02F 1/469* (2006.01)
(Continued)

(52) U.S. Cl.
CPC ............ *C02F 1/4695* (2013.01); *B01D 61/425* (2013.01); *B01D 61/427* (2013.01);
(Continued)

(58) Field of Classification Search
CPC ....... B01D 61/48; C02F 1/4695; C02F 1/469; C02F 1/4698
USPC ......... 204/450, 520, 522, 524, 529, 533, 536, 204/539, 600, 620, 632
See application file for complete search history.

(56) References Cited

U.S. PATENT DOCUMENTS 5,858,191 A   1/1999   DiMascio et al.
7,651,600 B2   1/2010   Han et al.
(Continued)

FOREIGN PATENT DOCUMENTS

EP            1 995 220 A1    11/2008
WO       2005/105272 A1    11/2005
(Continued)

OTHER PUBLICATIONS

European Patent Office, International Search Report and Written Opinion for PCT/US2011/041231 (PCT application corresponding to the subject US application) (Dec. 6, 2011).
(Continued)

*Primary Examiner* — Keith Hendricks
*Assistant Examiner* — Steven A. Friday
(74) *Attorney, Agent, or Firm* — Modern Times Legal; Robert J. Sayre

(57) ABSTRACT

A liquid electrolyte can be desalinated and purified using a system that includes a first electrode and a configuration selected from (a) a second electrode and at least one distinct ion-selective boundary and (b) a second electrode that also serves as the ion-selective boundary. The ion-selective boundary is contained in the liquid conduit adjacent to a porous medium that defines pore channels filled with the liquid and that have a surface charge, and the charge of the ion-selective boundary and the surface charge of the pore channels share the same sign. A liquid including at least one charged species flows through the pore channels, forming a thin diffuse electrochemical double layer at an interface of the liquid and the charged surface of the pore channels. A voltage differential is applied between the electrodes across the porous medium to draw ions in the liquid to the electrodes to produce brine at the electrodes and to create a shock in the dissolved-ion concentration in the bulk volume of the liquid within the pore channels, wherein a depleted zone with a substantially reduced concentration of dissolved ions forms in the liquid bulk volume between the shock and the ion-selective boundary.

16 Claims, 25 Drawing Sheets

(51) Int. Cl.
*B01D 61/42* (2006.01)
*B01D 61/44* (2006.01)
*B01D 61/46* (2006.01)
*B01D 61/50* (2006.01)
*B01D 63/06* (2006.01)
*C02F 1/461* (2006.01)

(52) U.S. Cl.
CPC .............. *B01D 61/44* (2013.01); *B01D 61/46* (2013.01); *B01D 61/48* (2013.01); *B01D 61/485* (2013.01); *B01D 61/50* (2013.01); *B01D 63/06* (2013.01); *B01D 2313/345* (2013.01); *C02F 1/46109* (2013.01); *C02F 1/46114* (2013.01); *C02F 1/469* (2013.01); *C02F 1/4691* (2013.01); *C02F 1/4693* (2013.01); *C02F 1/4698* (2013.01); *C02F 2001/46161* (2013.01); *C02F 2201/4611* (2013.01); *C02F 2201/46115* (2013.01); *C02F 2201/4613* (2013.01); *C02F 2201/46165* (2013.01); *C02F 2305/08* (2013.01); *B01D 61/42* (2013.01); *B01D 61/445* (2013.01)

(56) References Cited

U.S. PATENT DOCUMENTS

| | | |
|---|---|---|
| 2006/0118420 A1 | 6/2006 | MacDonald et al. |
| 2006/0154997 A1 | 7/2006 | Inoue et al. |
| 2006/0231406 A1 | 10/2006 | Freydina et al. |
| 2007/0201124 A1 | 8/2007 | Whitesides et al. |
| 2007/0295604 A1 | 12/2007 | Freydina |
| 2009/0242406 A1 | 10/2009 | Han et al. |
| 2010/0078327 A1 | 4/2010 | Noh et al. |

FOREIGN PATENT DOCUMENTS

| | | |
|---|---|---|
| WO | 2008/130579 A1 | 10/2008 |
| WO | 2010/011760 A1 | 1/2010 |

OTHER PUBLICATIONS

M. Turek, "Cost effective electrodialytic seawater desalination", Elsevier Science, vol. 153, No. 1, (Feb. 10, 2003), pp. 371-376.

M. Shannon, et al., "Science and technology for water purification in the coming decades", Nature, vol. 452 (Mar. 20, 2008), pp. 301-310.

V. Nikonenko, et al., "Intensive current transfer in membrane systems: Modelling, mechanisms and application in electrodialysis", Advances in Colloid and Interface Science, vol. 160 (Oct. 15, 2010), pp. 101-123.

A. Mani, et al., "Desalination shocks in microstructures", arXiv:1108.0871v1 [physics.flu-dyn] (Aug. 3, 2011), pp. 1-14.

J. Krol, et al., "Concentration polarization with monopolar ion exchange membranes: current-voltage curves and water dissociation", Journal of Membrane Science, vol. 162 (Sep. 1, 1999), pp. 145-154.

T. Hayes, et al., "Overview of emerging produced water treatment technologies", 11th Annual International Petroleum Environmental Conference, (Oct. 12, 2004), pp. 1-36.

V. Dydek, et al., "Overlimiting Current in a Microchannel", Phys. Rev. Lett., vol. 107, Issue 11, (Sep. 2011), pp. 1-5.

Y. Oren, "Capacitive deionization (CDI) for desalination and water treatment—past, present and future (a review)", Desalination, vol. 228 (2008), pp. 10-29.

S. Kim, et al., "Direct seawater desalination by ion concentration polarization", Nature Nanotechnology, vol. 5 (Mar. 21, 2010), pp. 297-301.

A. Mani, et al., "On the propagation of concentration polarization from microchannel-nanochannel interfaces. Part I: Analytical model and characteristic analysis", Langmuir, vol. 25, Issue 6 (Mar. 10, 2009), pp. 3898-3908.

T. Wolgemoed, et al., "Capacitive Deionization Technology(TM): An alternative desalination solution", Elsevier, vol. 183 (2005), pp. 327-340.

Y. Wang, et al., "Million-fold preconcentration of proteins and peptides by nanofluidic filter", Anal. Chem., vol. 77, No. 14 (Jun. 10, 2005), pp. 4293-4299.

S. Kalogirou, "Seawater desalination using renewable energy sources", 31 Progress in Energy and Combustion Sciences 242-281 (2005).

DESALINATION AND PURIFICATION SYSTEM

RELATED APPLICATION

This application is a divisional of U.S. application Ser. No. 13/165,042, filed 21 Jun. 2011. This application also claims the benefit of U.S. Provisional Application No. 61/356,769, filed 21 Jun. 2010. The entire content of both of these applications are incorporated herein by reference.

BACKGROUND

In this century, the shortage of fresh water is expected to surpass the shortage of energy as a global concern for humanity, and these two challenges are inexorably linked. Fresh water is one of the most fundamental needs of humans and other organisms. Each human needs to consume a minimum of about two liters per day, in addition to greater fresh-water demands from farming as well as from industrial processes. Meanwhile, techniques for transporting fresh water or for producing fresh water via purification and desalination of seawater, brackish water, waste water, contaminated water, etc. tend to be highly demanding of increasing scarce supplies of affordable energy.

The hazards posed by insufficient water supplies are particularly acute. A shortage of fresh water may lead to famine, disease, death, forced mass migration, cross-region conflict/war (from Darfur to the American southwest), and collapsed ecosystems. In spite of the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only 0.75% of all water on Earth as available fresh water.

Moreover, that 0.75% of available fresh water is not evenly distributed. For example, heavily populated developing countries, such as India and China, have many regions that are subject to scarce supplies. Further still, the supply of fresh water is often seasonally inconsistent. Typically confined to regional drainage basins, water is heavy and its transport is expensive and energy-intensive.

Meanwhile, demands for fresh water are tightening across the globe. Reservoirs are drying up; aquifers are falling; rivers are drying; and glaciers and ice caps are retracting. Rising populations increase demand, as do shifts in farming and increased industrialization. Climate change poses even more threats in many regions. Consequently, the number of people facing water shortages is increasing.

Even when fresh water is available, billions of people live with unacceptable levels of contamination. There is a growing need for water purification systems that can remove not only common ions, but also various dangerous trace impurities such as arsenic, copper, radioactive particles, fertilizers, bacteria, viruses, etc. many of which are difficult to eliminate efficiently with traditional filters and membranes. Cheap, low-power, portable systems could have a major impact on public health, if they could be easily deployed to remote or under-developed locations with poor or nonexistent water distribution infrastructure.

Massive amounts of energy are typically needed to produce fresh water from seawater (or to a lesser degree, from brackish water), especially for remote locations. Reverse osmosis (RO) is currently the leading desalination technology, but it is energy intensive and still relatively inefficient due to the large pressures required to drive water through semi-permeable membranes and their tendency for fouling. In large-scale plants, the energy/volume required can be as low as 4 kWh/$m^3$ at 30% recovery, compared to the theoretical minimum around 1 kWh/$m^3$, although smaller-scale RO systems (e.g., aboard ships) can have much worse efficiency, by an order of magnitude.

Rather than extracting pure water, electrochemical methods, such as electrodialysis (ED) and capacitive desalination (CD), extract just enough salt to achieve potable water (<10 mM). Current large-scale electrochemical desalination systems are less efficient than RO plants at desalinating seawater (e.g., 7 kWh/$m^3$ is the state of the art in ED), but become more efficient for brackish water (e.g., CD can achieve 0.6 kWh/$m^3$). These electrochemical methods also offer advantages for efficient high-recovery purification of partially or completely desalinated water, by expending energy mainly to remove just the undesirable particles, rather than most of the water molecules, from the solution. Existing ED and CD methods, however, do not reach the same level of water purity as RO, since some undesirable particles can flow past the electrodes or membranes.

SUMMARY

Described herein are methods and apparatus for desalination (salt removal) and liquid purification (particulate removal) using macroscopic porous media and membranes, exploiting the formation of sharp gradients in salt concentration, which we call "desalination shocks", driven by surface conduction and electro-osmotic flow. Various embodiments of the apparatus and method may include some or all of the elements, features and steps described below.

In the apparatus, a conduit is provided for liquid flow therethrough, and at least two electrodes are configured to drive ionic current in liquid flowing from an inlet port to a desalinated/purified liquid outlet port in the conduit. At least one ion-selective boundary (e.g., ion-exchange membrane) is configured to conduct the ionic current and selectively transmit or remove counter-ions while blocking co-ions from the liquid, and at least one porous medium is adjacent to the ion-selective boundary (i.e., the porous medium is not necessarily in contact with the ion-selective boundary; though if separated, the separation distance is very small, of the order of the screening length, e.g., of the order of 2-100 nm in aqueous solutions) and on an opposite side of the ion-selective boundary from the second electrode in the conduit. The porous medium has a surface charge with a sign that is the same as the sign of the co-ions to enable conduction of an ionic surface current (in the double layers) carried by the counter-ions and consequent production of a region of desalinated/purified liquid, wherein the desalinated/purified liquid outlet port is positioned to extract the desalinated/purified liquid from the porous medium. The method and apparatus involve the formation of a sharp salt concentration gradient (i.e., a "desalination shock") in a region of the porous medium near the membrane. The desalination shock enables membrane-less separation (i.e., where ions can be separated and removed in the porous medium without needing a physical barrier or membrane at the separation location). In this shock region, the rate of change in salt concentration as a function of distance from the membrane is substantially greater than it is elsewhere across the continuous pore channels in the porous medium. A depleted region of lower salinity (e.g., fresh water) is thereby produced in the bulk liquid between the shock region and the membrane. In addition to classical bulk diffusion, ion transport from the liquid is enhanced by surface conduction within the screening cloud (or double layers)

within the pores, and the removal of, e.g., fresh water from the depleted region can be driven by electro-osmotic and/or pressure-driven flow.

In some embodiments, one of the electrodes can serve as the ion-selective boundary. For example, a porous metal electrode can store counterions capacitively in its double layers, while rejecting co-ions. An electrode undergoing electrodeposition of metal ions (or other electrochemical adsorption/deposition processes) can achieve the same result. In a particular example, the ion-selective boundary is a copper cathode that removes copper ions from a copper chloride aqueous solution in a packed bed of silica microspheres by electrodeposition. This removal of the copper ions triggers the same "desalination shock" phenomenon in the porous medium leading to over-limiting current and desalinating the copper chloride solution.

Multiple assemblies can be stacked in parallel to boost the flow rate. As in traditional electrodialysis, brine can be produced in the electrode compartments by redox reactions and removed by pressure-driven flow, though the porous medium in this apparatus provides a new method of fresh water recovery and particle filtering.

These methods and systems can be applied in low-cost, low-voltage, macroscopic systems to produce useful flow rates for both small-scale and large-scale applications and can be used with a variety of water sources, including seawater, brackish water, sewage, industrial wastewater, contaminated drinking water, oil-well wastewater and agricultural wastewater, or with other liquids. In one example, the apparatus is powered by a battery or by solar panels coupled with the system. Suitable applications include small-scale uses in remote regions with limited access to fresh water and energy and/or in the military, wherein the apparatus can be transported by individual soldiers or groups of soldiers, or in a vehicle. In other embodiments, the system can be coupled with the electrical grid for large-scale fresh-water production. The system can be used for a variety of purposes, including desalination and purification of sea water or brackish water, as well as ionic liquids or electrolytes that are not water-based (such as alcohol-based electrolytes, organic electrolytes, surfactant-stabilized colloids or micelles in non-polar solvents, etc.), or cleaning porous materials or soils by flowing a liquid therethrough and extracting ions and counter-ions from the porous material through the system.

The methods and systems can also provide ultra-filtration with reduced membrane filtering; and fresh water produced with these methods and systems can be free of negatively charged impurities (such as most dirt and viruses), allowing only positively-charged particles that fit through the pores (e.g., having a diameter less than 100 nm) to pass through the shock region. Accordingly, the porous medium and shock region can also protect the membrane surface from fouling by preventing particles from reaching the membrane. The porous medium can also be of an inexpensive composition and, in particular embodiments, is easy to clean or replace (whereas, the membrane, if fouled, typically is comparatively difficult to clean and expensive to replace).

BRIEF DESCRIPTION OF THE DRAWINGS

FIG. 7 shows an alternating stack of combined elements from FIG. 5. FIG. 8 shows an alternating stack of the components in FIG. 1.

FIGS. 27 and 28 illustrate the trade-off between water recovery ($Q_{fresh}/Q_{in}$) and desalination factor by controlling the outlet flow rate ratio ($Q_{fresh}/Q_{brine}$), wherein FIG. 27 shows excellent desalination at low water recovery (and at high energy cost/volume), while the system in FIG. 28 produces much more salt in the fresh water outlet with high water recovery.

FIG. 31 shows the conductivity profile for varying values of applied voltage. FIG. 32 shows the conductivity profile for several Pe values.

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
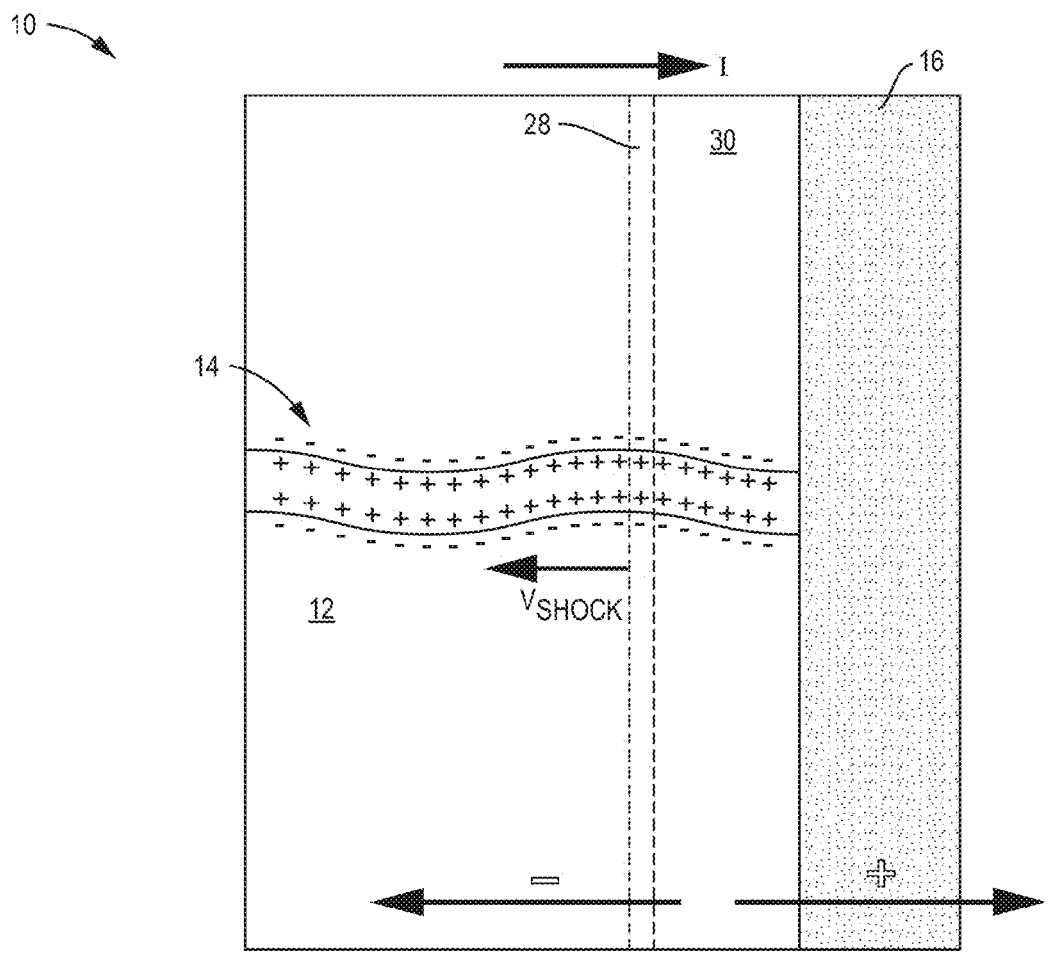
FIG. 1 shows the basic elements of a desalination and purification system, including a cationic porous medium (CPM) with negatively charged pores in contact with a cation exchange membrane (CEM).

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

In the following examples, we assume without loss of generality that the liquid is water containing dissolved salts and charged impurities to be removed by the apparatus and methods described herein. It will be understood that the same apparatus and methods can be applied by those skilled in the art to other liquids containing dissolved ions and/or charged impurity particles. Some examples are given below, after embodiments are specified, in detail, for the applications dealing with desalination and purification of aqueous solutions.

A desalination and purification system 10 is shown in FIG. 1. A cationic porous medium (CPM) 12 with negatively charged pore channels 14 is in contact with a cation exchange membrane (CEM) 16. A liquid including co-ions and oppositely charged counter-ions, charged impurities and/or charged droplets flows left-to-right as shown through the cationic porous medium 12. Direct electric current is passed from the cationic porous medium 12 through the cation exchange membrane 16, and a desalination shock forms at the CPM/CEM interface and propagates into the cationic porous medium 12, leaving behind a depleted region of fresh water (the term, "fresh water," as used herein, can represent potable water having less than approximately 10 mM of dissolved salts). Particles suspended in the input stream are also rejected by size or charge at the entrance to the cationic porous medium (at the left side of the cationic porous medium 12 in FIG. 1) and are further rejected by the shock within the cationic porous medium 12. The direction of flow for anions and cations in the system are shown with respective arrows. Though a gap for liquid flow is shown here between the anode 19 and the cationic porous medium 12, the anode 19 and cationic porous medium 12 can be in flush contact in other embodiments, and the source liquid can be directly injected into the porous medium 12.

The porous medium 12 has a rigid structure and has ideally a high surface charge. In one embodiment, the cationic porous medium 12 is a porous glass frit with approximately 1-micron pores, and the cation exchange membrane 16 is formed of a sulfonated-tetrafluroethyele-based fluoropolymer-copolymer (commercially available as a NAFION membrane from E. I. du Pont de Nemours and Company), which is assembled together with a porous cathode 18. Alternatively, the cationic porous medium 12 can take many other naturally occurring or artificially fabricated forms, such as the following:
- electrochemically prepared porous materials, such as anodic aluminum oxide with parallel nanopores;
- fused or packed beds of silica beads, latex spheres, or other colloid particles (see embodiment, discussed below);
- zeolite materials;
- other types of porous glass or ceramic frits;
- porous polymer materials,
- functionalized polymers with large negative surface charge,
- cross linked polymers; or
- porous metals or semiconductors with oxide coatings.

The cationic porous medium 12 can also be made from any of the following:
- polydimethylsiloxane (PDMS),
- polymethylmethacrylate (PMMA),
- other elastomeric materials,
- etched or milled glass,
- silicon or other semiconductors, or
- other solid materials with micro/nano-fabricated artificial pore networks extending therethrough.

The porous material may also contain ion-exchange resins or nanoporous materials to enhance counterion conductivity to the counterion-selective boundary. This will promote desalination shocks leading to strong salt depletion in the larger pores if the conduction paths for counterions have few interruptions. If, however, as in packed beds of ion-exchangers, the conduction paths terminate and produce transient enrichment and depletion regions at the pore scale, then mixing due to concentration polarization and nonlinear electro-osmotic flows can prevent the formation of desalination shocks, or cause them to widen, thereby lowering their salt separation efficiency. For this reason, particular embodiments include porous materials that have pore thicknesses that mostly fall into an optimal range of negligible double-layer overlap and suppressed convection within the pores (e.g., 100 nm to 10 microns in aqueous solutions). The microstructure can also be anisotropic to optimize surface conduction to the membrane, while allowing for transverse flow to extract the desalinated fluid, as described below.

Figure 2:
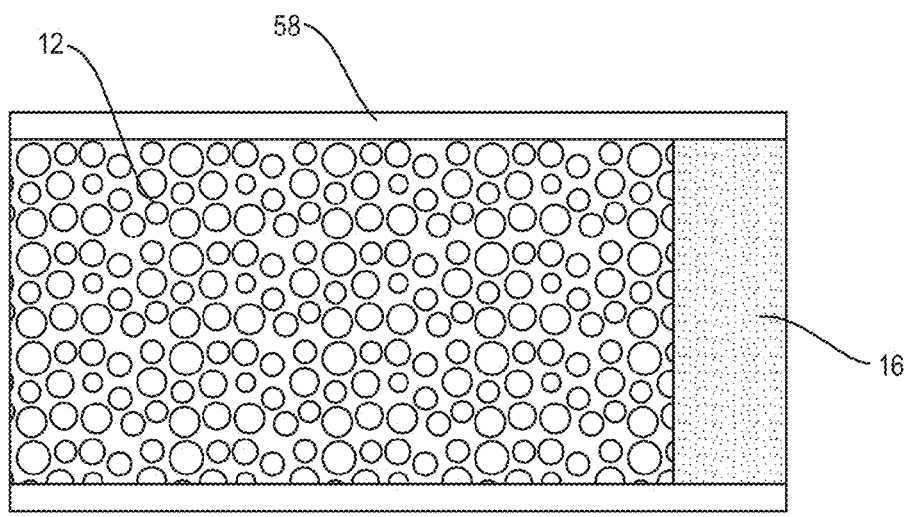
FIG. 2 shows another embodiment of the system of FIG. 1, where the cationic porous medium is a packed bed of microns-sized negatively charged beads (e.g., silica or latex) in a liquid-filled tube or column.

In the embodiment of FIG. 2, the cationic porous medium 12 is a packed bed of microspheres formed, e.g., of silica or latex. The microspheres can be loaded by flow into a tube 58 and condensed toward the end by centrifuge. This method also allows for easy porosity grading or other control of the spatial variation in microstructure of the cationic porous medium 12, by varying the loading strategy or type of particles. For example, finer particles can be employed (thereby reducing pore volume) in regions of the system where restricted fluid flow is desired. Accordingly, the packed bed of particles can have non-uniform porosity, surface charge, or microstructure on a scale at least an order of magnitude greater than average particle diameter to promote increased liquid flow through particular regions of the system. In other embodiments, the surface charge or microstructure can be substantially varied in different regions to control the spatial distribution of fluid flow through the system. Pressure buildup, however, may disrupt the packing and interfere with stable shock formation.

Many of the same types of materials can also be used in an anionic porous medium 13 (see FIG. 5), with positive surface charge, such as positively charged polymeric porous materials, positively charged self-assembled monolayers or thin films on porous substrates, or artificially prepared surfaces by polymeric layer-by-layer deposition, starting from any of the cationic porous media listed above. With any of these cases of cationic or anionic porous media, the surface charge, surface ionic mobility, and/or electro-osmotic slip mobility can be enhanced by surface treatments, films, coatings, or self-assembled molecular layers.

Figure 3:
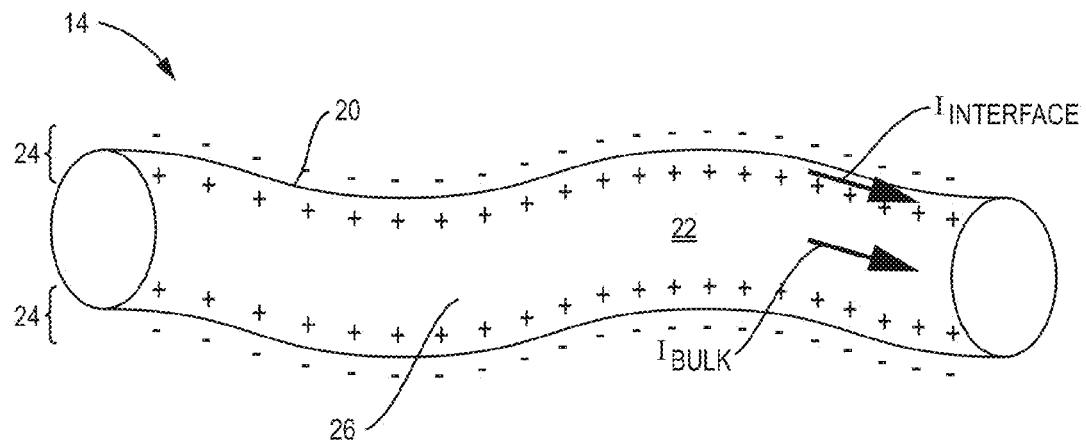
FIGS. 3 and 4 are illustrations intended to explain the basic physics of desalination shock formation in a charged pore filled with a liquid electrolyte.
Figure 4:
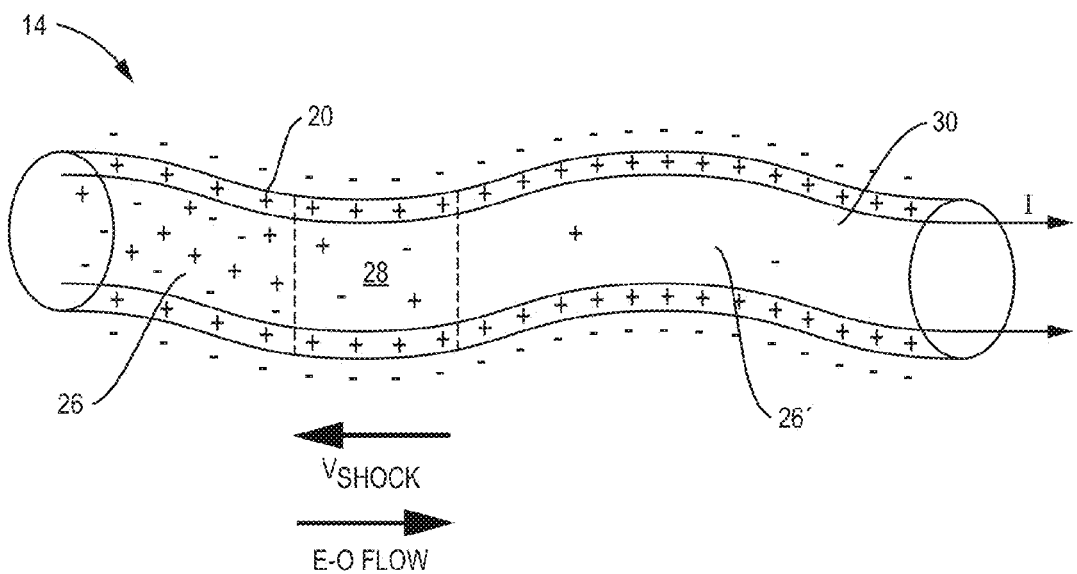

To illustrate the principles behind the formation of the desalination shock, a channel for electrolyte liquid flow through the pore channels 14 in the cationic porous medium 12 is shown in FIGS. 3 and 4. As shown in FIG. 3, the pore walls 20 of the cationic porous medium 12 have a negative charge and attract excess positive ions from the liquid to form double layers 24 at the interfaces of the pore walls 20 and the liquid 22. Typically, the double layers 24 are thin compared to the channel thickness. The pore channels have a sufficient diameter, $h_p$ (e.g., at least 50 nm in water, or more generally, greater than the Debye length), to prevent overlap of double layers on opposite sides of the pore channel. The liquid volume 26 bounded by the double layers 24 is termed the "bulk liquid." More precisely, when the excess salt in the double layers 24, relative to the quasi-neutral solution, is subtracted, what remains is the effective volume of bulk electrolyte 26 filling the pores. As shown, the pore size, $h_p$, is greater than the Debye screening length, $\lambda_D$; and $\lambda_D$ is below 1 nm in seawater and can be as large as 100 nm in deionized water.

The pore channel 14 can be conceptually divided into three regions, as shown in FIG. 4. The liquid in the bulk volume 26 has a high charge content, or ionic conductivity, on the left side (as shown) where the initial liquid is introduced; as a result, electric current flows primarily through the bulk liquid here. In the center is a "shock region" 28 in which current flows shift from being primarily in the bulk liquid volume 26 (on the left side) to being primarily in the double layer 24 (to the right). The bulk liquid volume 26' in the region 30 to the right of the shock region 28 is depleted (i.e., has a very low content of charged ions, particles or droplets); consequently, the electrical resistance in the bulk liquid volume 26' in the depleted region 30 is lower than the electrical resistance along the double-layer interface 24. Accordingly, this depleted bulk liquid volume 26' can be regarded as being desalinated and/or purified compared with the initial liquid fed into the system 10. The fundamental mechanism for the formation of the depleted region 30 is surface conduction through the double layers 24, which becomes increasingly important compared to classical diffusion in the bulk liquid 26/26', as the salt concentration is reduced by the ion-selective surface (of the membrane 16 or electrode 18). The basic physics of desalination shocks are described in A. Mani and M. Z. Bazant, "Desalination Shocks in Microstructures," which was included in the parent provisional application (U.S. Ser. No. 61/356,769).

Figure 5:
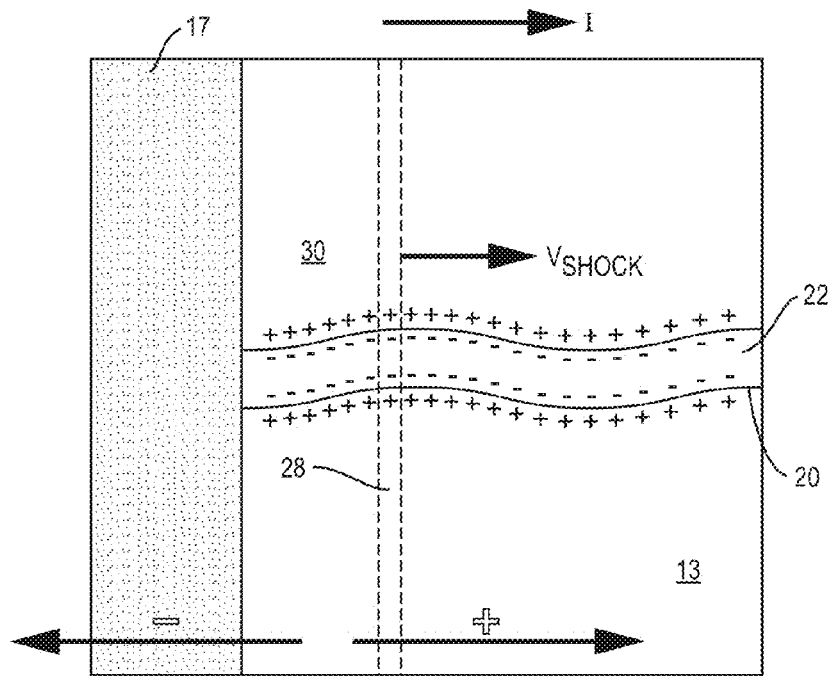
FIG. 5 shows another embodiment of the desalination and purification system, including an anionic porous medium (APM) with positively charged walls in contact with an anion exchange membrane (AEM) and with a desalination shock formed in the anionic porous medium.

An alternative embodiment of the system is shown in FIG. 5, wherein the pore walls 20 of an anionic porous medium 13 have a positive charge, thereby attracting a thin layer of negatively charged ions from the liquid 22 at the interface of the pore walls 20 and the liquid 22. In this embodiment, the membrane is an anionic exchange membrane 17 to facilitate the transport of negatively charged ions therethrough. During the passage of direct current from the anion exchange membrane through the anionic porous medium, a desalination shock forms in the porous medium, again leaving behind a depleted zone of desalinated and purified ("fresh") liquid (e.g., fresh water).

Figure 6:
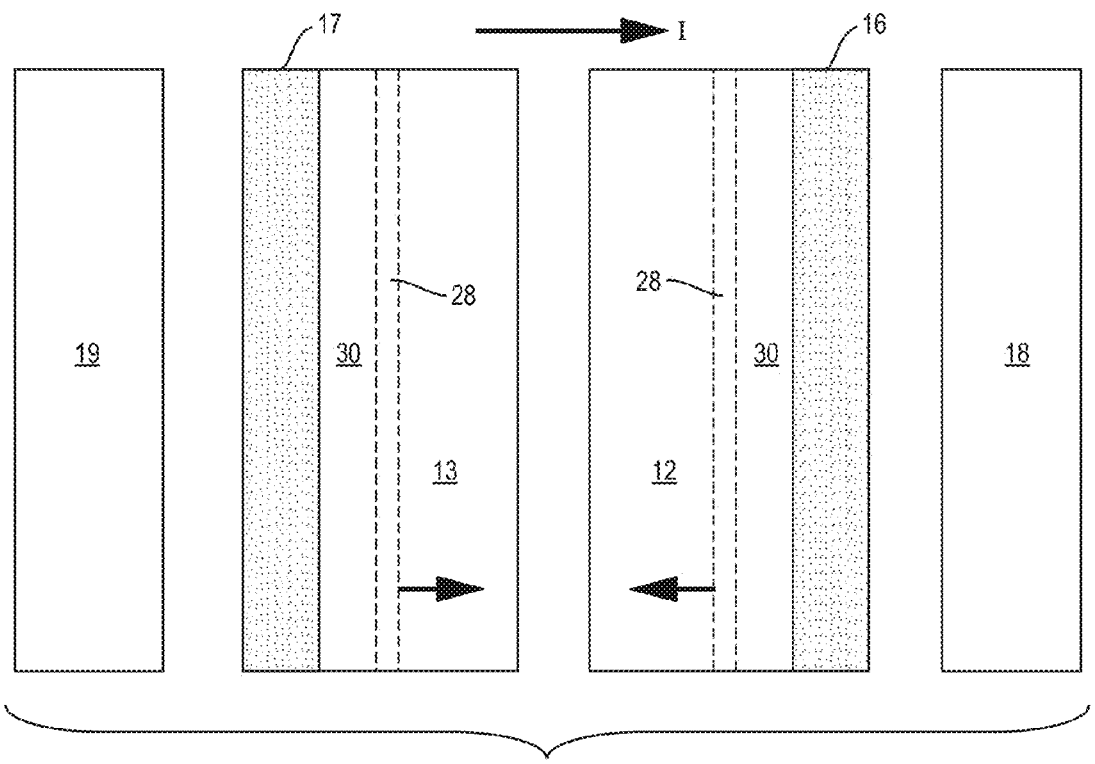
FIG. 6 shows how the components of FIGS. 1 and 5 can be combined in a two-electrode device to produce fresh liquid in two locations behind two resulting shocks.
Figure 7:
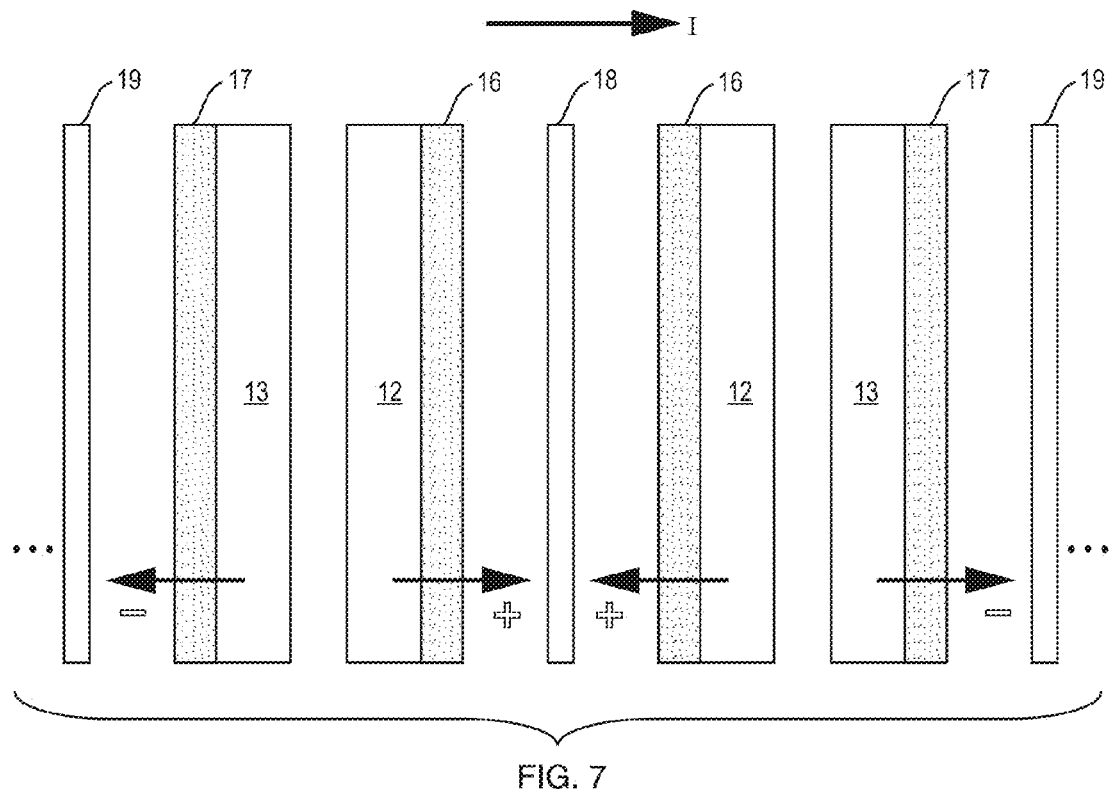
FIGS. 7 and 8 show periodic repetitions of the elements above in parallel stacks, to achieve larger flow rates.
Figure 8:
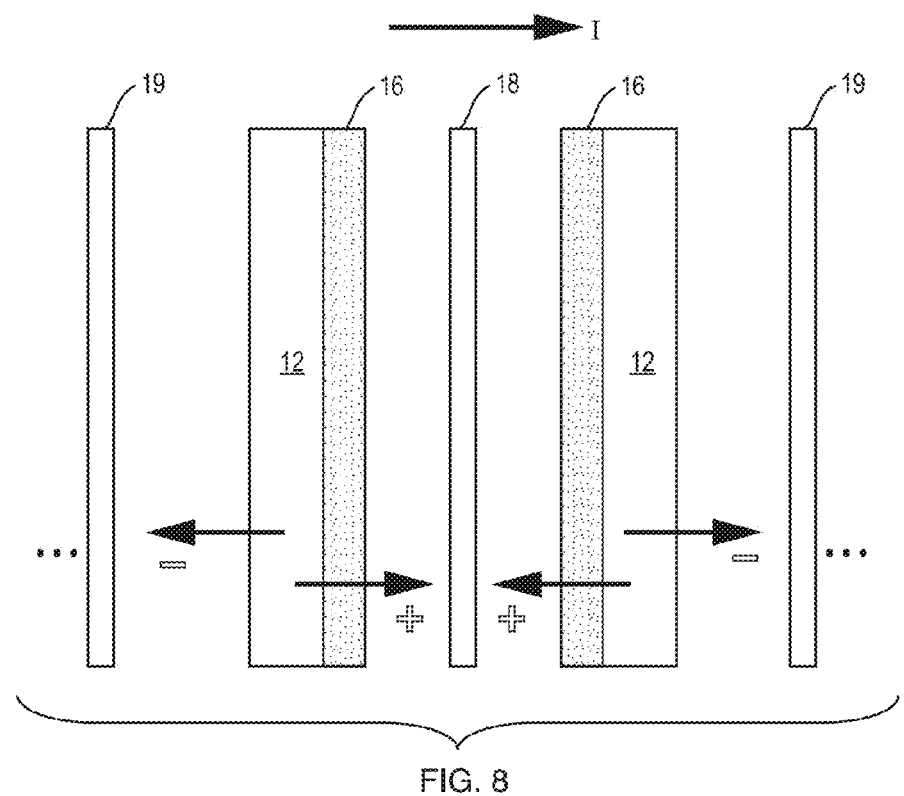

In additional embodiments, as shown in FIG. 6, a combination of cationic and anionic shock elements, including both cationic and anionic exchange membranes 16 and 17 and adjacent porous media 12 and 13 can be provided. These elements can be periodically repeated in a stack configuration. Though gaps are shown between the cationic porous medium 12 and the anionic porous medium 13 in FIGS. 6 and 7; these layers can be in direct contact in other embodiments. Stacked configurations are shown in FIGS. 7 and 8. The stacked system of FIG. 7 includes both anionic and cationic media and membranes, while the stacked system of FIG. 8 includes only cationic media and membranes, along with anodes 19 and cathode 18.

Figure 9:
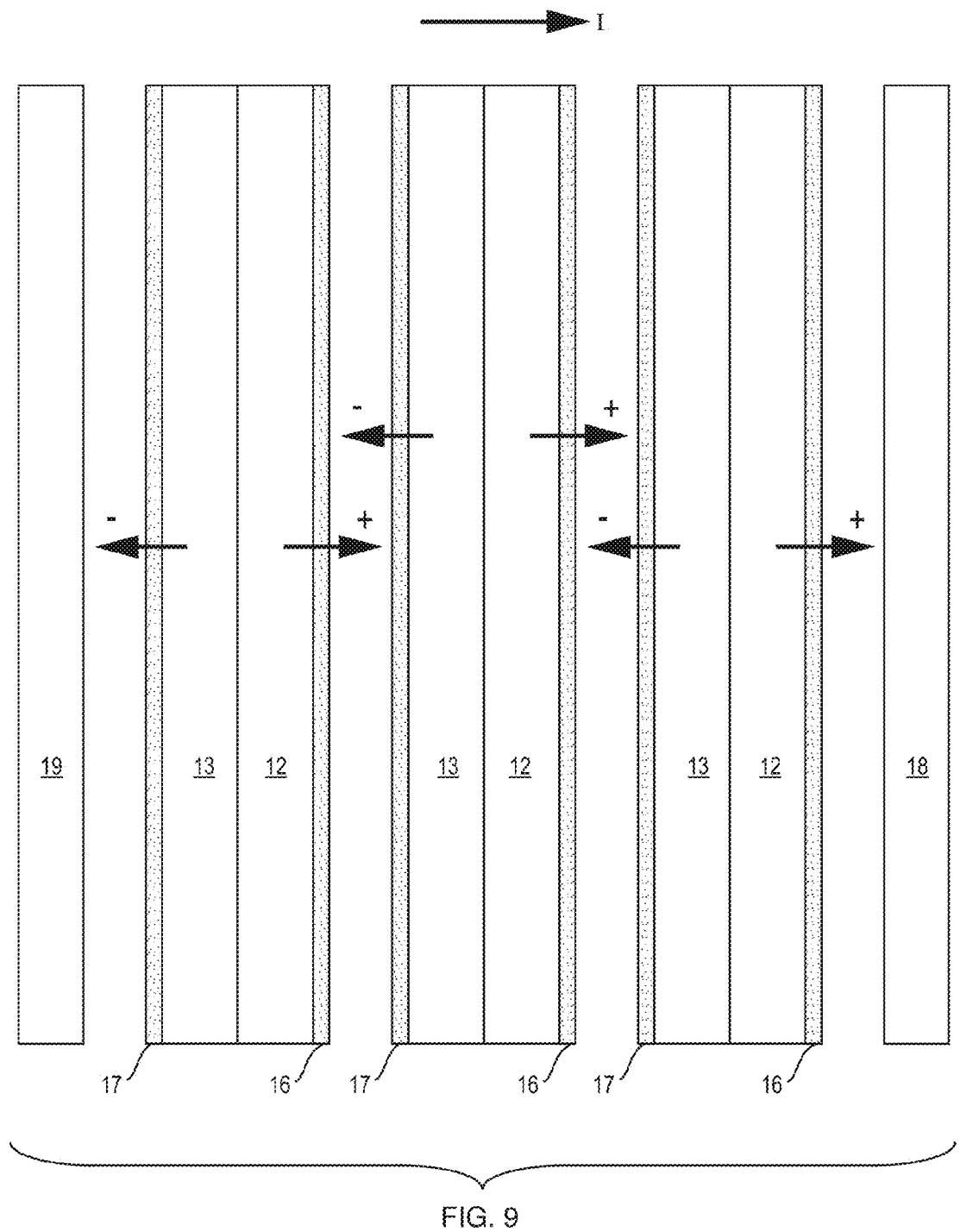
FIG. 9 shows a periodic repetition of structures comprising APM and CPM sandwiched between AEM and CEM.

Another stack configuration is shown in FIG. 9, which includes a serial repetition of sandwiches of an integrally coupled anionic porous medium 13 and a cationic porous medium 12 between an anion exchange membrane 17 and a cation exchange membrane 16, wherein negative charges flow to the left toward the anode 19 and positive charges flow to the right toward the cathode 18. This structure is, in some ways, similar to a standard electrodialysis structure, except that the dialysate channels are filled with anionic porous medium 13/cationic porous medium 12 sandwich structures. In contrast to electrodialysis, these porous media are used to produce desalination shocks that drive localized "membrane-less" desalination and purification processes within the porous media.

Figure 10:
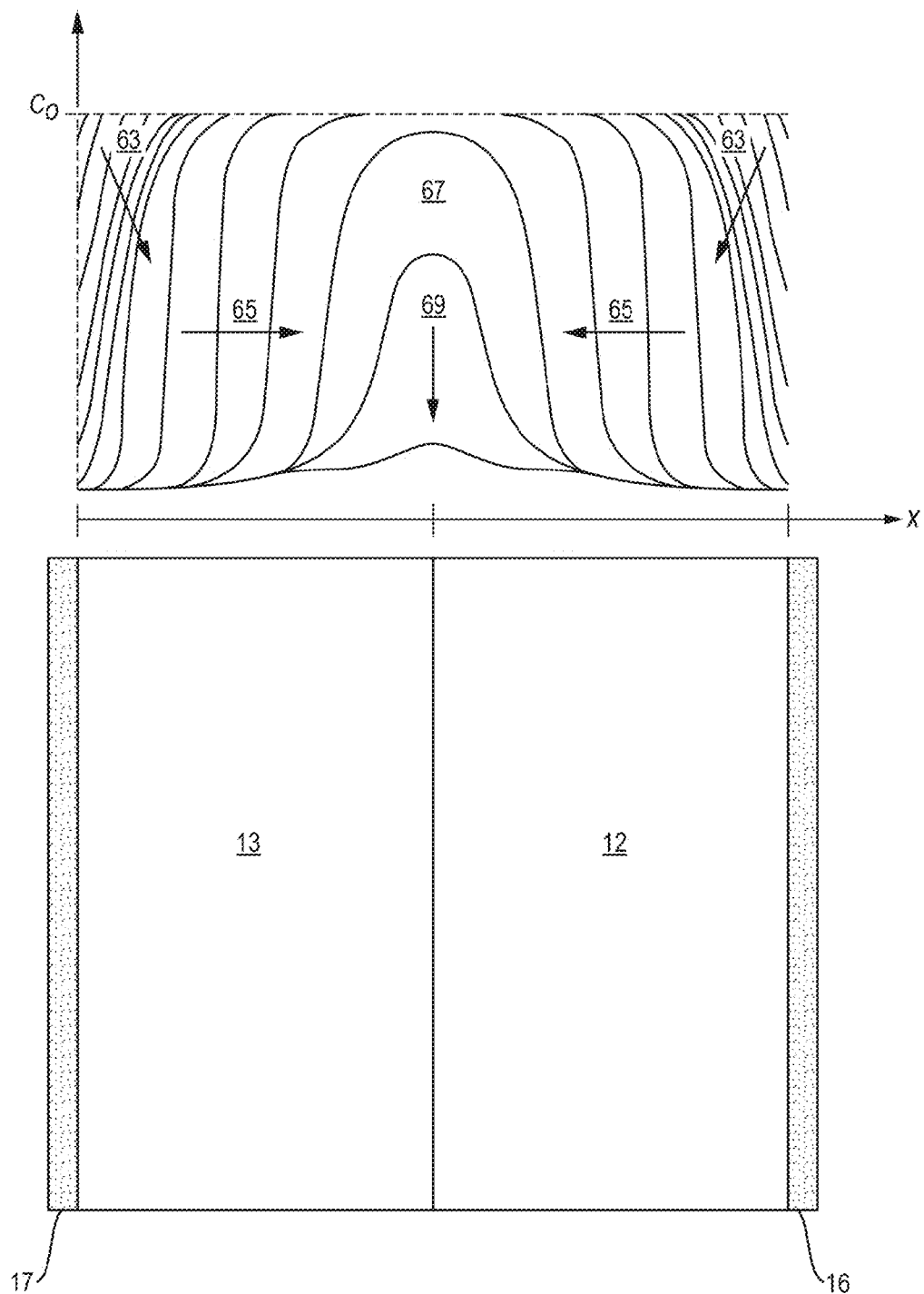
FIG. 10 shows a sandwich structure of FIG. 9 with a plot of the transient salt concentration profile in one APM/CPM section.

One anionic porous medium 13/cationic porous medium 12 sandwich structure from FIG. 9 is shown in FIG. 10 along with the transient salt concentration profile across the structure at constant current. The following four regions are shown in the corresponding plot of salt concentration ($c_o$) versus horizontal coordinate: region 63 (initial depletion by diffusion), region 65 (shock propagation), region 67 (shock collision), and region 69 (exponential relaxation to complete desalination).

Figure 11:
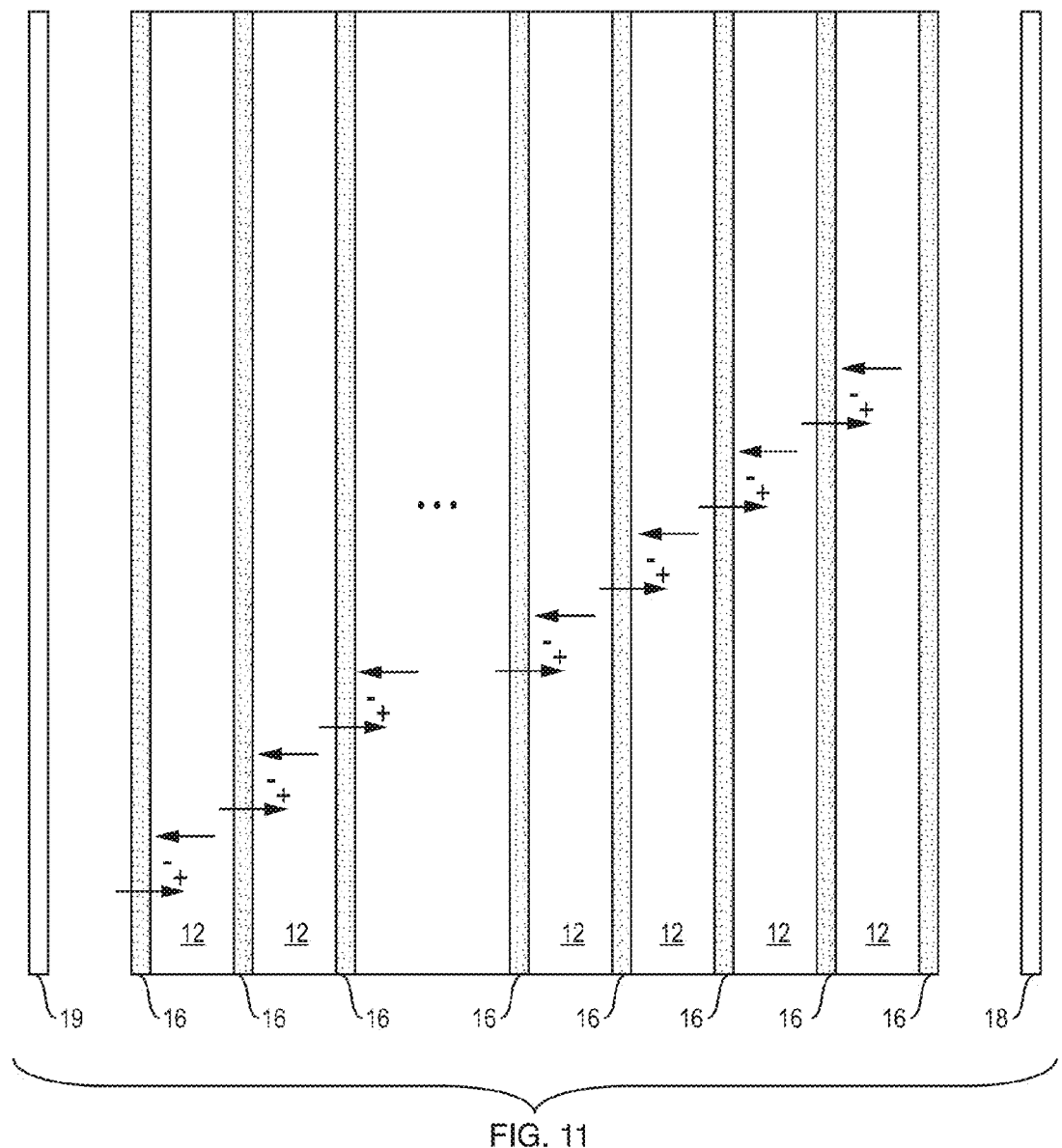
FIG. 11 shows a stack of alternating CPM/CEM layers leading to membrane-less separation of salt in the CPM layers.
Figure 12:
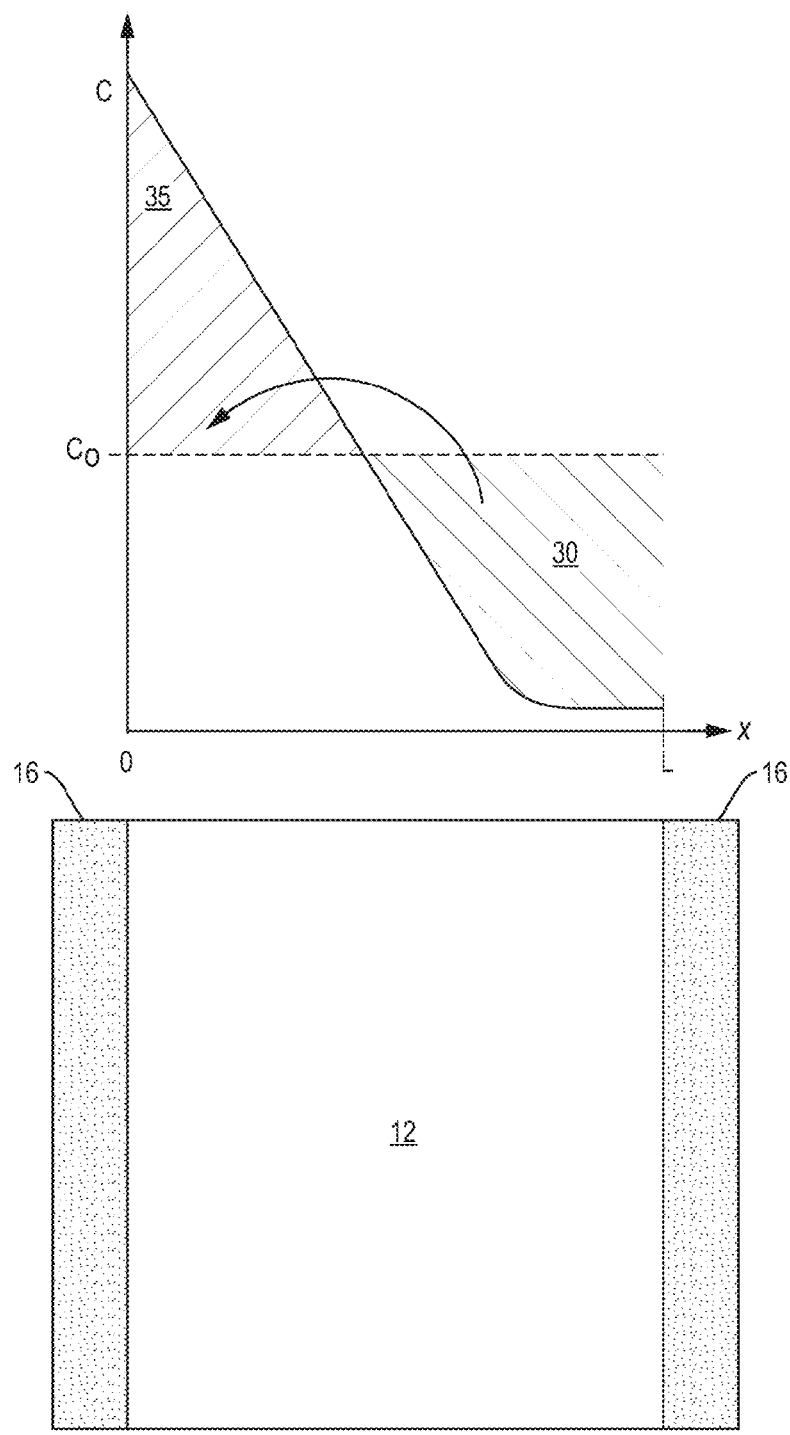
FIG. 12 shows a CPM sandwiched between two CEM layers with a plot of the steady salt concentration profile in the CPM.

A stack of alternating cationic porous media 12/cation exchange membranes 16 are shown in FIG. 11, wherein anions migrate across the layers toward the anode 19, while cations migrate toward the cathode 18. This embodiment exemplifies "membrane-less separation" of salt in the cationic porous media 12 layers, as shown in FIG. 12. In FIG. 12, one layer of porous medium 12 from FIG. 11 is shown sandwiched between a pair of adjoining cation exchange membranes 16, and the salt concentration across this structure is plotted above. As shown in the plot, a depletion (desalinated) zone 30 of relatively pure water is formed on the right side of the cationic porous medium 12, while a brine zone 35 with a high salt concentration is formed on the left side of the cationic porous medium 12. The initial salt concentration ($c_o$) of the liquid is shown with the hashed line in the plot. This embodiment clearly shows the difference between desalination shock propagation and standard electrodialysis because it uses only one type of membrane, augmented by a porous material of the same surface charge. The desalination shock phenomenon leads to depletion of both cations and anions in the same location. In contrast, electrodialysis involves two different types of membranes, a cation-exchange membrane of negative internal charge to extract the cations and anion-exchange membrane of positive internal charge to extract the anions.

Figure 13:
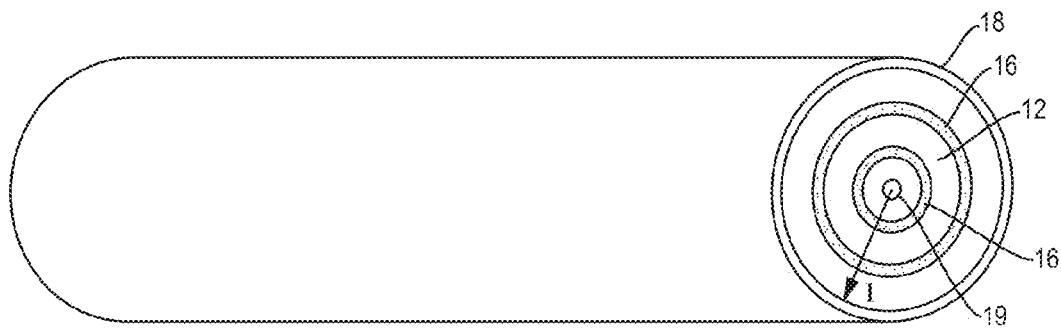
FIG. 13 shows a cylindrical configuration of the system shown in FIG. 11.

The various designs shown herein can be fabricated with the same sequence of structures along the current path but in alternative geometries. For example, the structure of FIG. 11 is reconfigured in FIG. 13 into a cylindrical configuration, while the structure of FIG. 9 is likewise reconfigured into a cylindrical configuration in FIG. 14.

Figure 15:
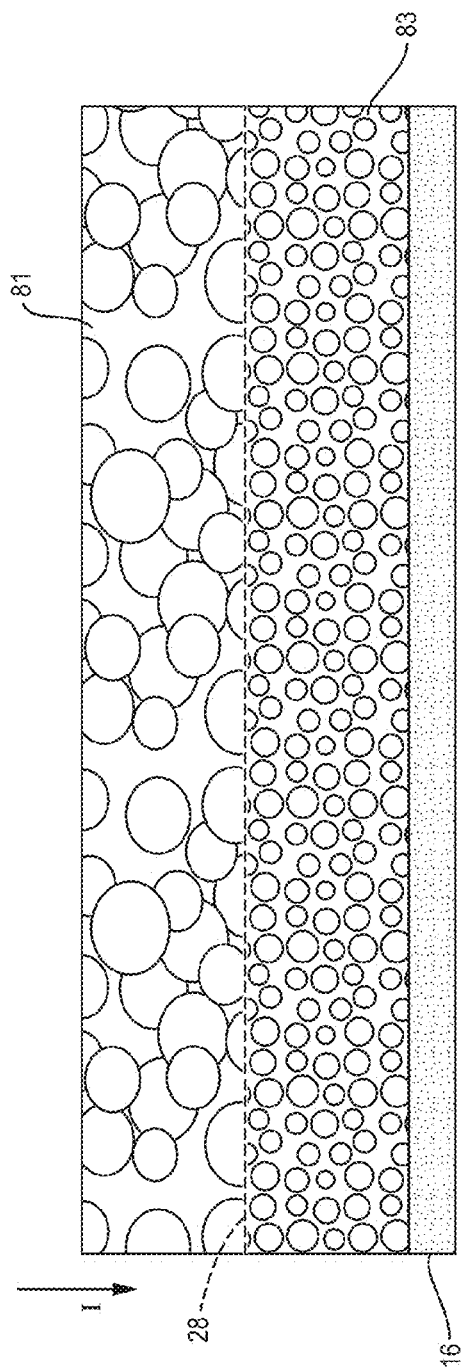
FIG. 15 shows a system with a heterogeneous porous medium, wherein the shock region is pinned at the interface between a finer-pore zone and a larger-pore zone.
Figure 16:
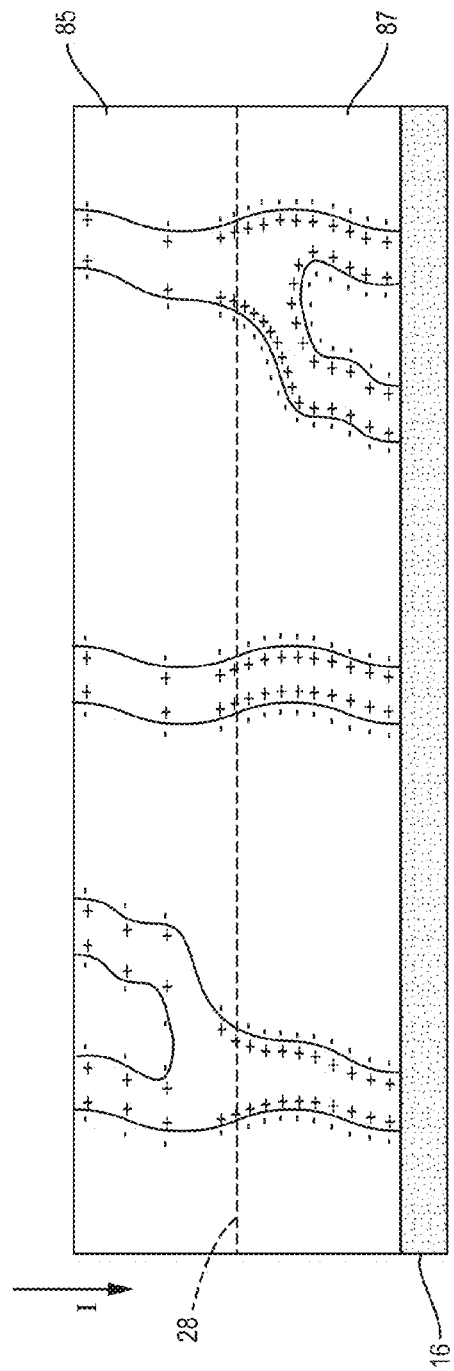
FIG. 16 shows a system with a heterogeneous porous medium that includes a lower-surface-charge zone and a higher-surface-charge zone.

In the various systems shown herein, heterogeneous porous materials (with spatially varying properties) can be used to control the location of the shock. For example, the shock 28 can be pinned at the interface between two regions of cationic porous media 12 with differently sized particles. As shown in FIG. 15, the top region 81 of the cationic porous medium can have larger particles and pores, while the bottom region 83 of the cationic porous medium can have finer particles and pores, with the shock 28 pinned at the interface of regions 81 and 83. In the embodiment of FIG. 16, the shock 28 is pinned at the interface of a lower-surface-charge region 85 and a higher-surface-charge region 87. In this way, the shock 28 can be "aimed" at splitting of the brine and fresh water outgoing streams (discussed, below), such that the desalinated liquid covers the fresh-water outlet, helping to optimize operation of the system.

Figure 17:
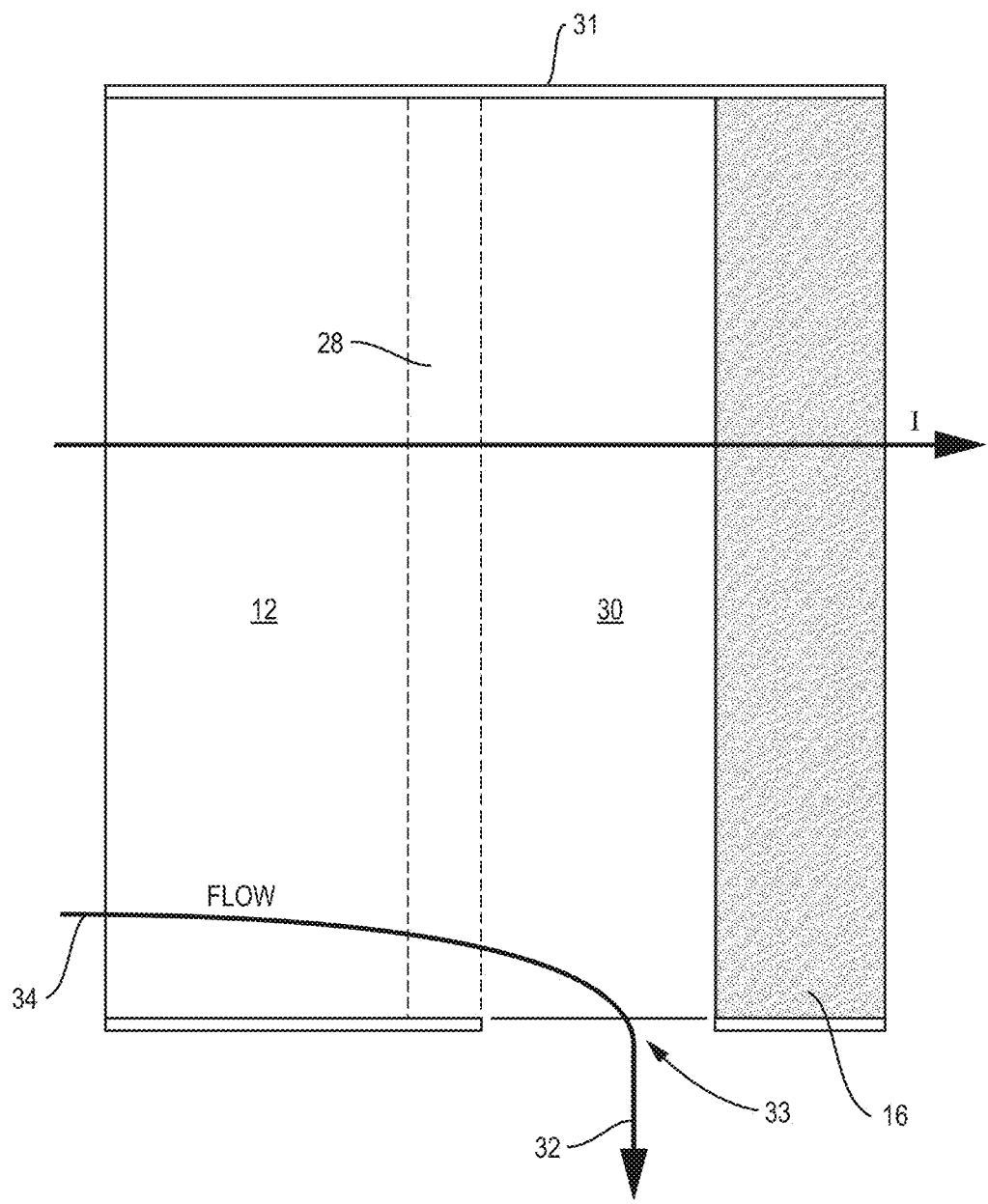
FIG. 17 shows a first method of fresh water recovery by allowing fresh liquid to escape via a gap in the sidewall of the conduit near the CPM/CEM interface and over the depleted zone in the cationic porous medium.

Recovery of desalinated water 32 is shown in FIG. 17. The recovery method exploits the pressure build-up in front of the membrane 16 due to electro-osmotic flow to eject fresh water from the depletion zone 30, behind the shock region 28 and in front of the membrane 16. The flow 34 is driven by electro-osmosis, wherein the liquid flow 34 through the system 10 coincides with the electric current flow 36 in the system 10, though the liquid flow 34 can be augmented by a pressure-driven flow to enhance the flow rate through conduit 31. In this design, removal of desalinated water 32 through outlet port 33 transverse to the current direction near the cation exchange membrane 16 may be enhanced by reduced porosity, increased pore size, or anisotropic porous microstructures of the cationic porous medium 12 in the region near the membrane 16 compared with elsewhere in the porous medium 12. This shows the potential importance of graded or non-uniform microstructures in shock membrane systems.

Figure 18:
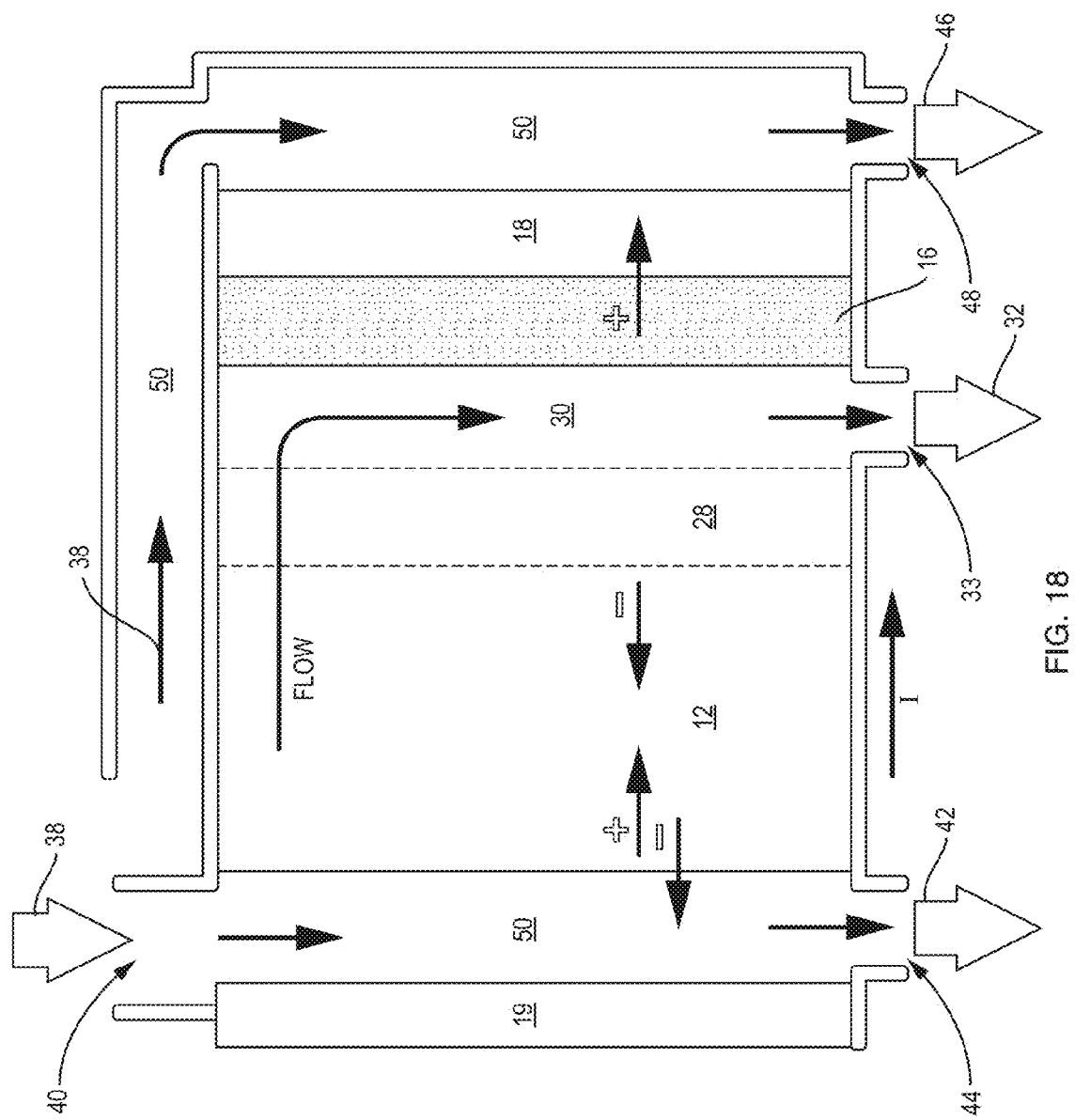
FIG. 18 shows a complete shock membrane apparatus, exploiting the desalination method of FIG. 1 and the water recovery method of FIG. 17. A weak pressure-driven flow is imposed (e.g., by gravity) to remove brine from the anode and cathode compartments and augment the electro-osmotic flow through the cationic porous medium driving fresh liquid out near the cation exchange membrane.

A system schematic diagram for shock desalination and purification using electro-osmotic flow (EO flow) is shown in FIG. 18, though the electro-osmotic flow can be supplemented with pressure-driven flow. Most impurity particles entrained in the incoming sea water or brackish water 38 fed through liquid inlet port 40 pass through the channel 50 between the anode 19 and the cationic porous media 12 to a brine output 42 ejected through a waste liquid outlet port 44. Additional impurity particles are filtered by the porous media 12. Cationic ions in the liquid pass from left to right and exit through the cation exchange membrane 16 into channel 50 to a brine output 46 through outlet port 48. An additional pressure-driven liquid flow is provided through channel 50 flush the brine 46 through the outlet port 48.

Figure 19:
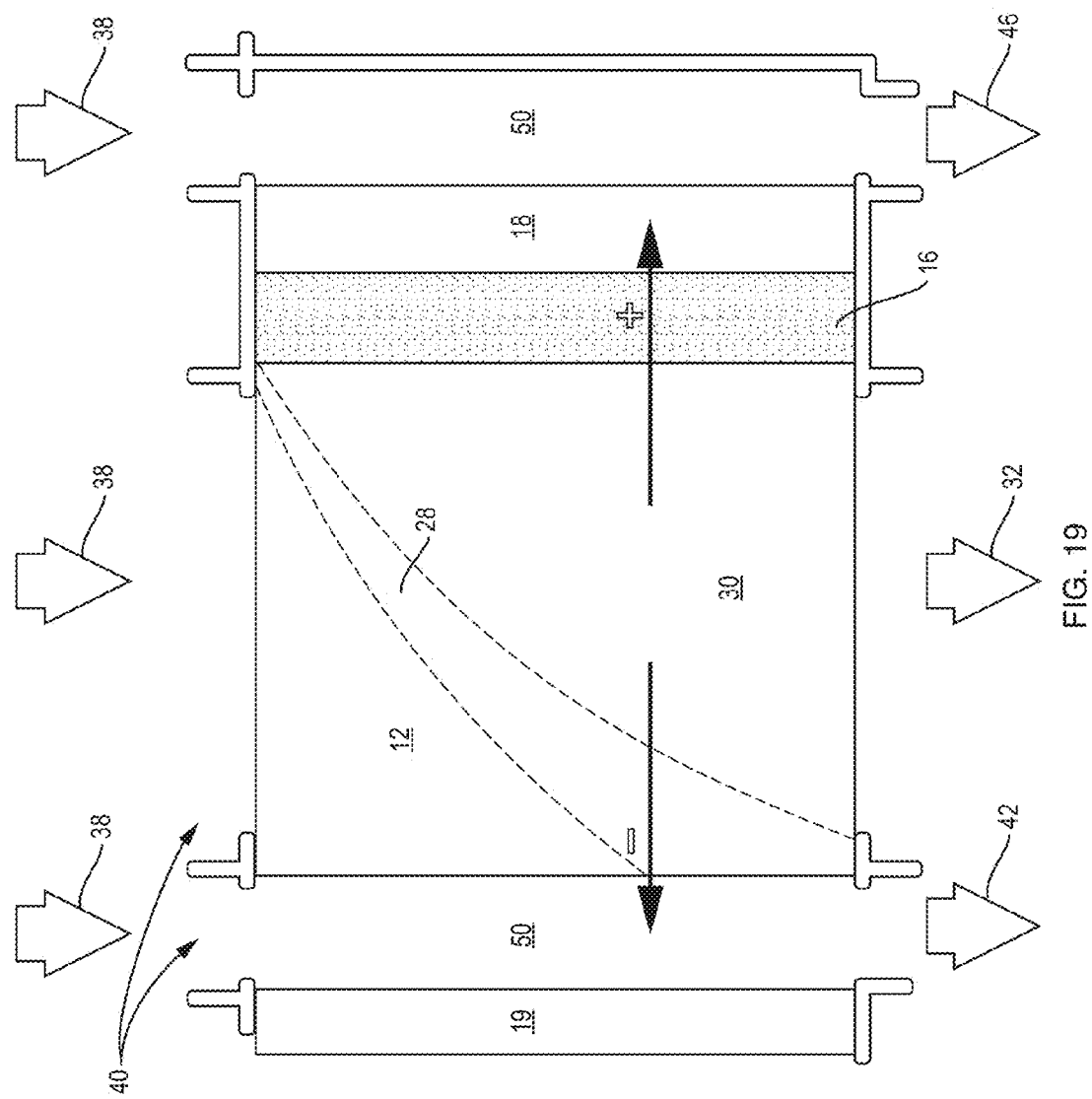
FIG. 19 shows a second method and apparatus of water recovery, using transverse-pressure-driven flow in the cationic porous medium. The shock traverses some or all of the cationic porous medium while bending in the flow, and the depletion zone extends to the side of the cationic porous medium, where fresh liquid is removed.

Another method and system for water recovery driven by transverse pressure-driven flow (downward flow of sea water inputs 38, as illustrated, without EO flow) is shown in FIG. 19. The components of this system can also be periodically repeated in a parallel stack to boost flow rate. In this embodiment, the shock region 28 angles diagonally across the cationic porous medium 12. In alternative embodiments, the gaps 50 adjacent to the anode 19 can be replaced with additional cationic porous medium; in particular embodiments, the additional cationic porous medium that replaces the gap can have a different porosity than the rest of the cationic porous medium 12.

Figure 20:
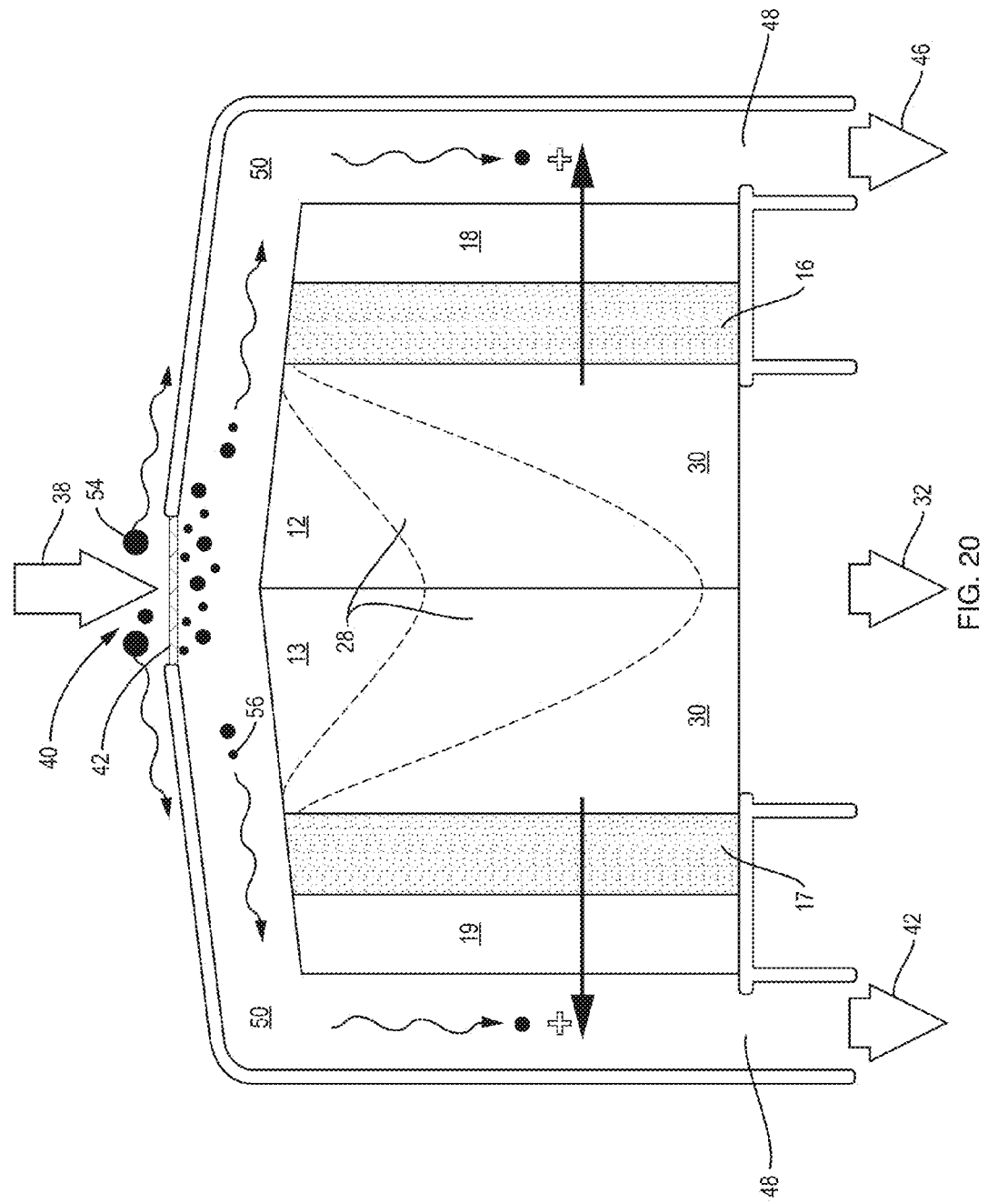
FIG. 20 shows another method and apparatus for water recovery, again using pressure-driven flow—here with both anionic-porous-medium and cationic-porous-medium elements in contact. The two shocks emanating from the two membranes collide prior to the side exit to allow easy removal of fresh liquid.

Another embodiment of the desalination and purification system including both cationic and anionic elements with no gap there between is shown in FIG. 20. Here, sea water 38 is pressure-driven into the system through inlet port 40; the inlet port 40 includes a filter 52 for screening out large particles 54 from entering the system. The sea water flows through downward through both the anionic porous medium 13 and the cationic porous medium 12. Smaller particles 56 that pass through the filter 52 at the inlet port 40 pass through channels 50 at the perimeter of the apparatus to flush out anions that pass through the (porous) anode 19 on the left and to flush out cations that pass through the (porous) cathode 18 on the right as brine output 46.

In the recovery methods of FIGS. 17-20, there may be additional outlet ports for co-flowing waste water (ahead of the shock region 28, away from the ion-selective surface), which is separated from the indicated outlet port for fresh water (behind the shock, closer to the ion-selective surface).

Figure 21:
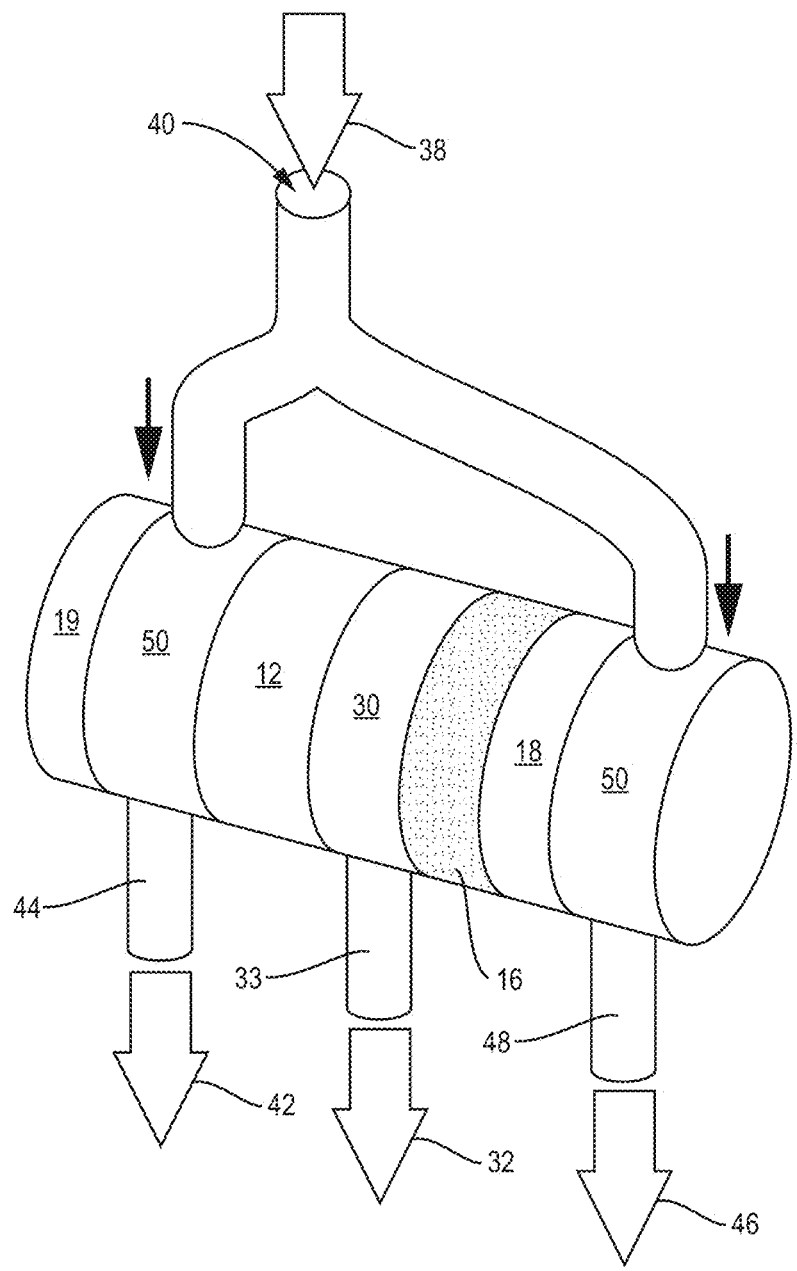
FIG. 21 shows an embodiment of the apparatus in FIG. 17, including a sandwich of the different elements, cut to have the same cross section and glued together.

A portable, low-power, small-scale embodiment of the shock desalination and purification system of FIG. 18 is shown in FIG. 21. In this embodiment, the cationic porous media is porous glass frit with a pore size of 1 micron. The cation exchange membrane is a NAFION membrane, and the cathode is porous.

Figure 22:
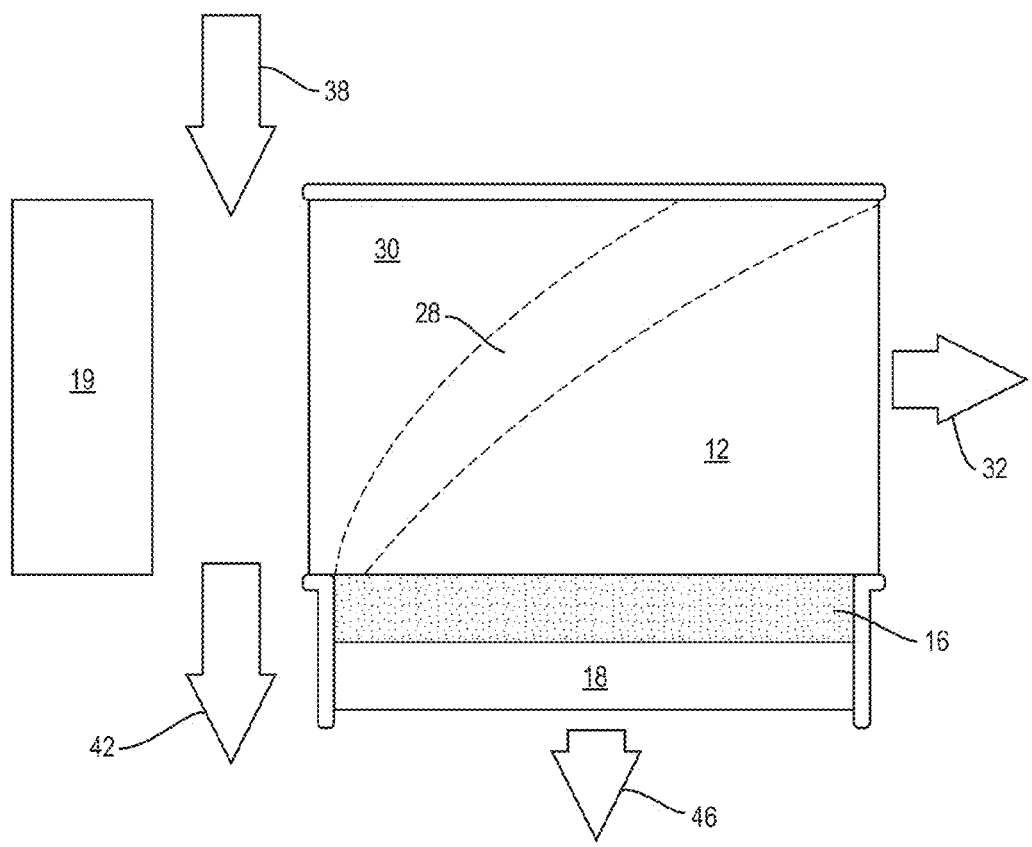
FIG. 22 shows a third method of water recovery, wherein one membrane-and-electrode assembly, the CEM/cathode (or AEM/anode), is placed on the side of the porous cationic (or anionic) porous medium, transverse to the other electrode, the anode (or cathode). The geometry allows electro-osmotic flow transverse to the membrane to contribute directly to water recovery, aided by possible pressure-driven flow along the same axis.
Figure 23:
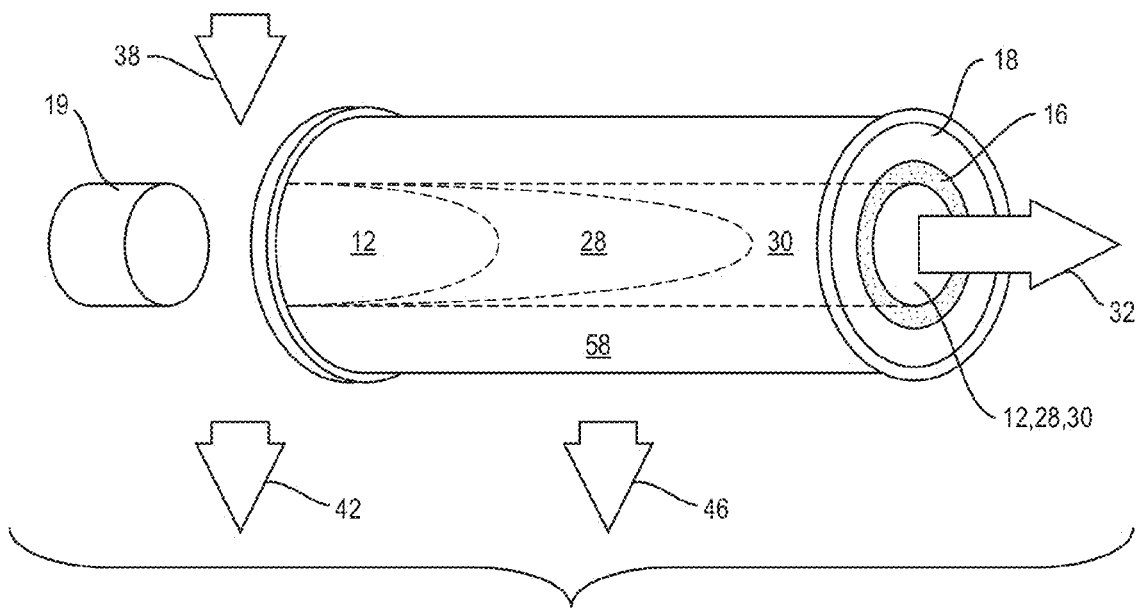
FIG. 23 shows another embodiment of the apparatus of FIG. 22, where the CPM/CEM/cathode assembly has the form of a coaxial tube. Fresh water emerges along the axis from the opposite end of the cationic-porous-medium core, while brine is produced in the outer annulus of the tube from the cathode, as well as on the front end of the tube, from the anode.

Another method of water recovery, shown in FIG. 22, involves repositioning one electrode (e.g., the anode 19) to drive electro-osmotic flow, which can be enhanced by applied pressure, into a porous material (e.g., a cationic porous medium 12) surrounded by the membrane/electrode assembly (e.g., a cation-exchange membrane 16 and a cathode 18). A tubular configuration of this embodiment is shown in FIG. 23.

Figure 14:
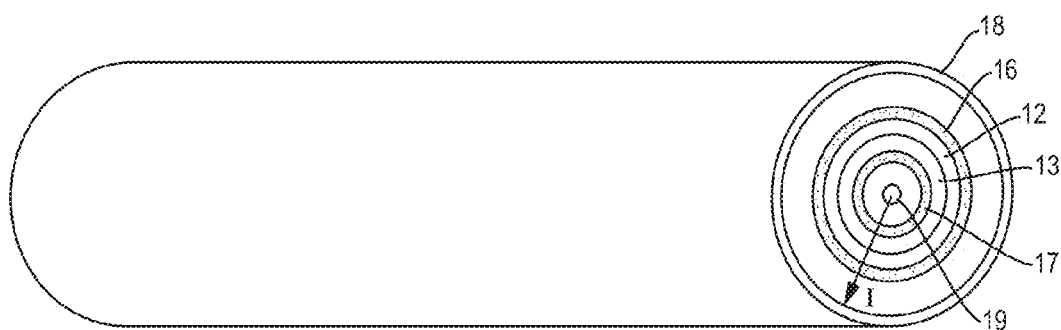
FIG. 14 shows a cylindrical configuration of the system shown in FIG. 9.
Figure 24:
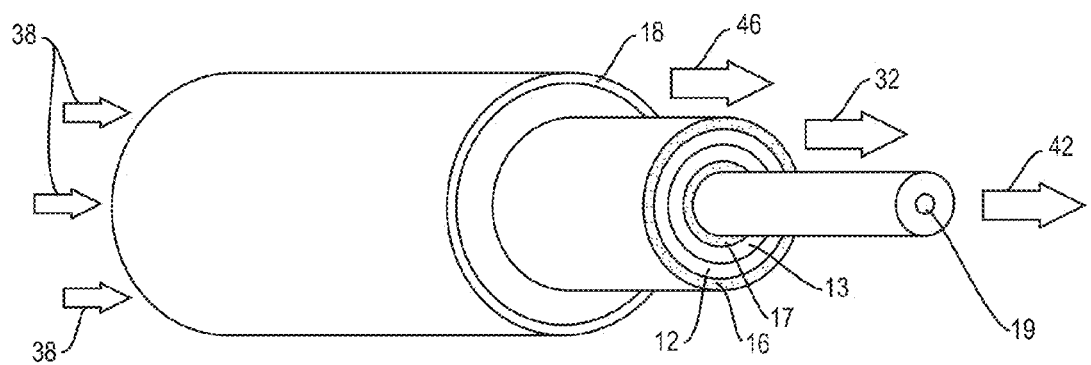
FIG. 24 shows the liquid flows for the system illustrated in FIG. 14.

The liquid flows for the system of FIG. 14 are shown in FIG. 24. At left, the input stream (e.g., sea water) 38 enters the system; and at right, desalinated and purified (fresh) water 32 is extracted between concentric flows of brine 42 and 46 from the system.

Figure 25:
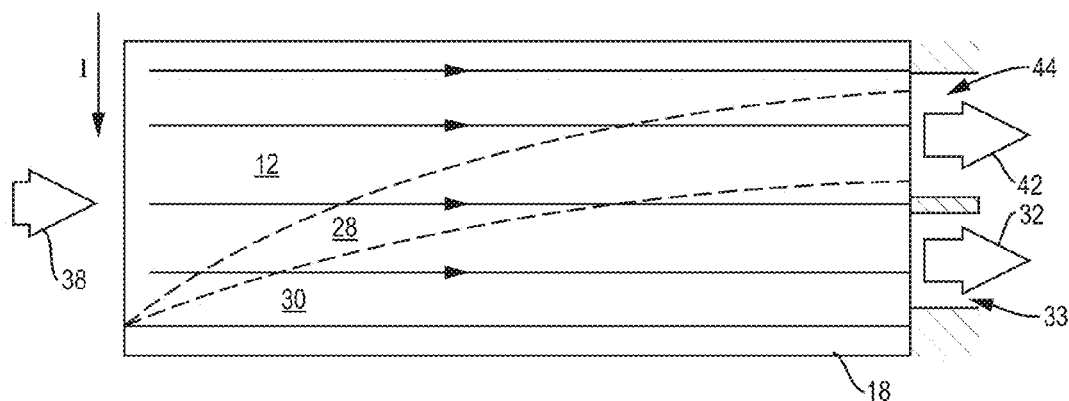
FIGS. 25 and 26 illustrate the trade-off between flow rate and desalination factor via the slow flow rate in FIG. 25, which allows the shock to extend past the outlet into the brine channel, in comparison with the high flow rate in FIG. 26, which causes the shock to leave the porous medium in the fresh water outlet, along with salty or unpurified input fluid.
Figure 26:
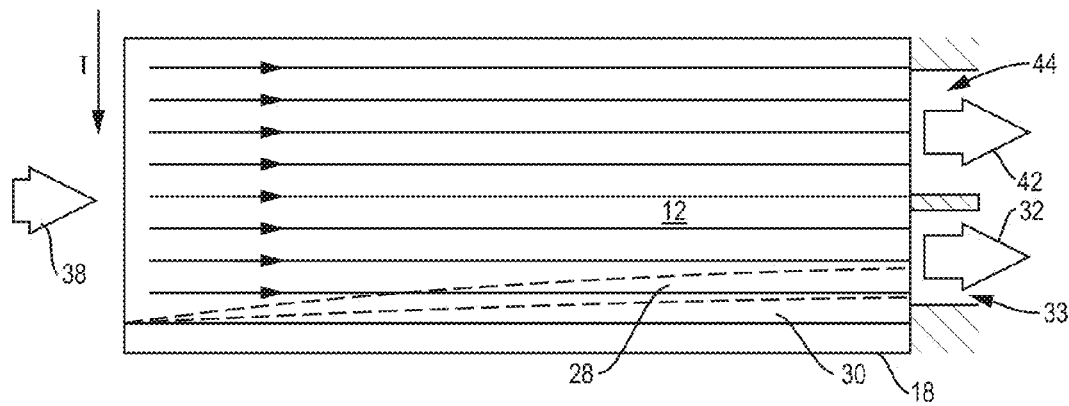

System optimization based on a trade-off between flow rate and desalination factor is shown in FIGS. 25 and 26. A low flow rate is used in FIG. 25, wherein the shock 28 extends past the fresh water outlet 33 yielding good desalination (i.e., low salt concentration in the "fresh" water 32). At high flow rates, as shown in FIG. 26, the shock stays close to the cathode 18 and salty inlet water 38 ends up in the "fresh" water output 32 exiting port 33. The slow flow system of FIG. 25 also has a power requirement that is higher than that of the fast flow system of FIG. 26.

Figure 27:
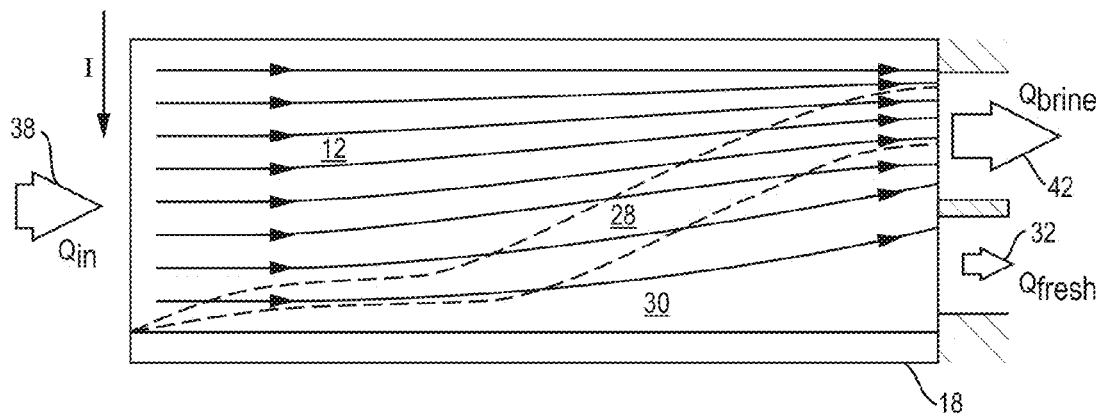
Figure 28:
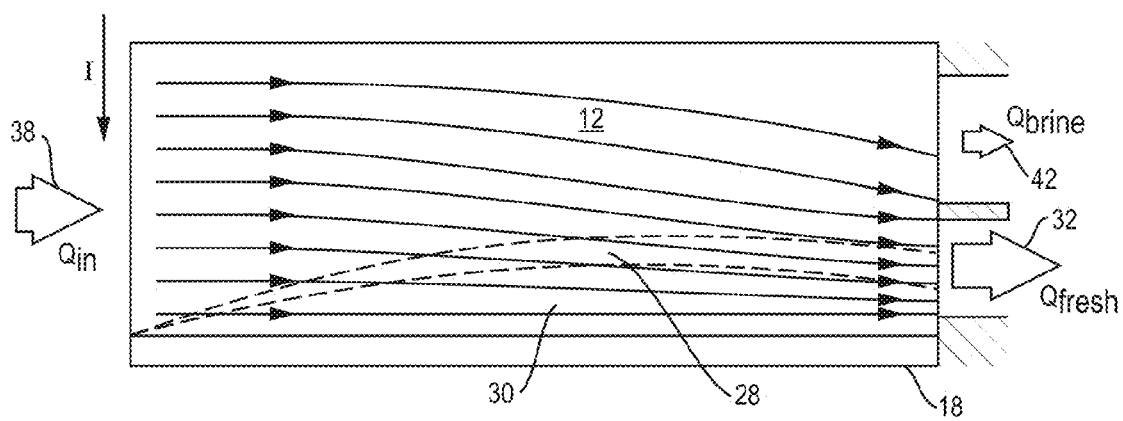

System optimization based on a trade-off between water recovery ($Q_{fresh}/Q_{in}$) and desalination (and power requirement) is shown in FIGS. 27 and 28 by controlling the outlet flow ratio ($Q_{fresh}/Q_{brine}$), with $Q_{in}$, I, etc., fixed. Low water recovery ($Q_{fresh}/Q_{in}$) is achieved in FIG. 27, though excellent desalination is achieved at high energy cost/volume. High water recovery ($Q_{fresh}/Q_{in}$) is achieved in FIG. 28, though a substantial amount of salt ends up in the fresh water output 32.

Figure 29:
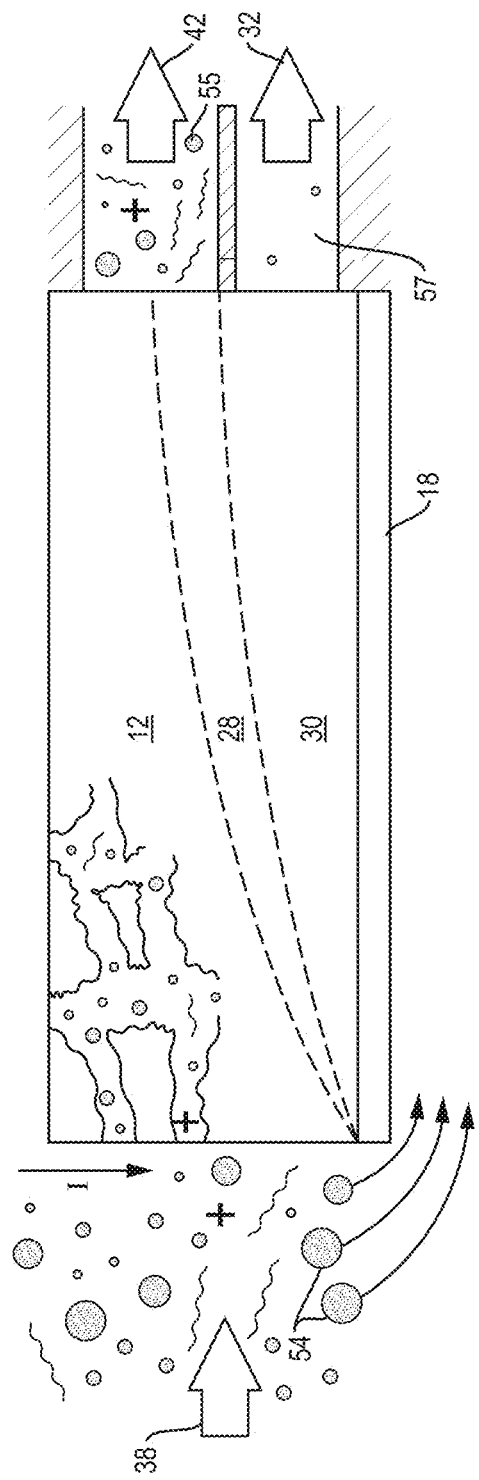
FIG. 29 illustrates principles of water purification by desalination shocks. Large particles are filtered by size before entering the porous medium. Sufficiently small co-ionic particles end up rejected by charge to the brine outlet stream. Only sufficiently small counterion-ionic particles can make it to the fresh outlet stream.

Principles of water purification and disinfection by desalination shocks are illustrated in FIG. 29. In this embodiment, the cationic porous medium 12 provides (ultra) filtration by size. The shock 28 rejects anionic particles 57 into the brine output 42. Consequently, the fresh water output 32 from the system contains only very small positively charged particles, which tend to be rare in water. Alternatively, where an anionic porous medium is used, cationic particles are rejected into the brine output, and the fresh water output includes only very small negatively charged particles. Moreover, all particles reaching the fresh water outlet experience large electric fields (e.g., >100 V/mm) in the low conductivity desalinated region behind the shock, thereby providing an effective means of disinfection. Such fields are sufficient to kill or neutralize living microorganisms, bacteria, fungi, spores, cells, viruses, etc.

In some embodiments, the outlet stream with higher concentrations of salt and co-ionic particles is a desirable product stream in continuous chemical processing, e.g., to produce more concentrated solutions of acids, electrolytes, colloidal particles, quantum dots, or small biological molecules or micro-organisms. In such embodiments, the lower concentration stream may be considered as waste.

Figure 30:
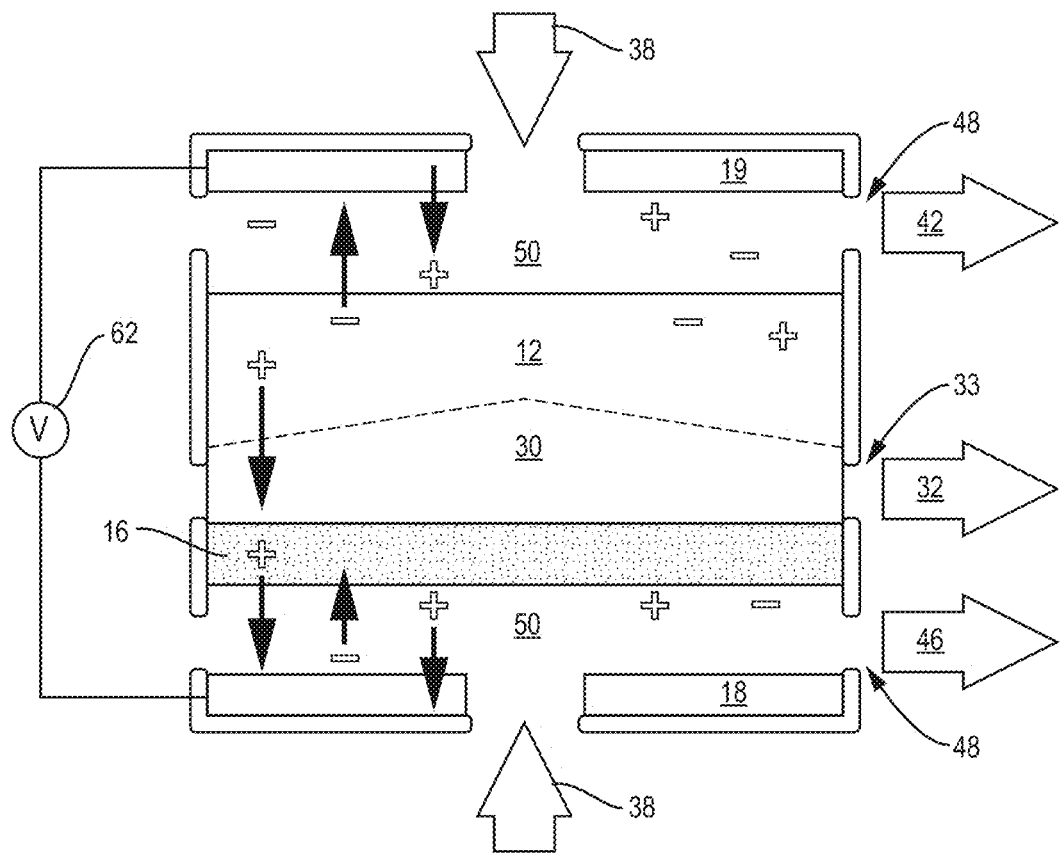
FIG. 30 shows another embodiment of the element in FIG. 1, including the pathways for fluid flow, as in the experimental results reported below.

A schematic illustration of a shock desalination and purification system 10 is shown in FIG. 30. The components include a porous medium 12 in the form of silica glass frit with a mean pore size whose order of magnitude is 1 micron in water (somewhat larger than the maximum Debye length) and an electrode membrane assembly, wherein the membrane 16 is a 2-mm-thin NAFION membrane (NR-212). Fused quartz glasses are used as packaging materials. The size of this prototype system is about 1 cm×1 cm×2 cm (cross-section×length). In this embodiment, the liquid (e.g., sea water) 38 enters through an aperture in the anode 19 and exits through an aperture in the cathode 18; and a voltage source 62 is coupled with the anode 19 and with the cathode 18 to drive current through the system 10.

In a simple, steady-state, one-dimensional model, an ionic solution is in porous media between an electrode and an ion-selective surface (membrane or electrode). The boundaries are assumed to be porous to allow for analyte flow, where the velocity is assumed to be uniform plug flow. At one end, the concentration of analyte is held constant; and at the other end, the cation is consumed by the ion-selective surface due to the applied current. Three dimensionless groups represent the physics in this model:

$$I = \frac{iL}{eDC_0}, \quad Pe = \frac{UL}{D}, \quad \gamma = \frac{\rho_s}{eC_0},$$

where i is the applied current density, L is the distance between electrodes, D is the diffusivity, $C_0$ is the original concentration of analyte, U is the flow velocity and $_s$ is the surface charge per volume of the pores.

Figure 31:
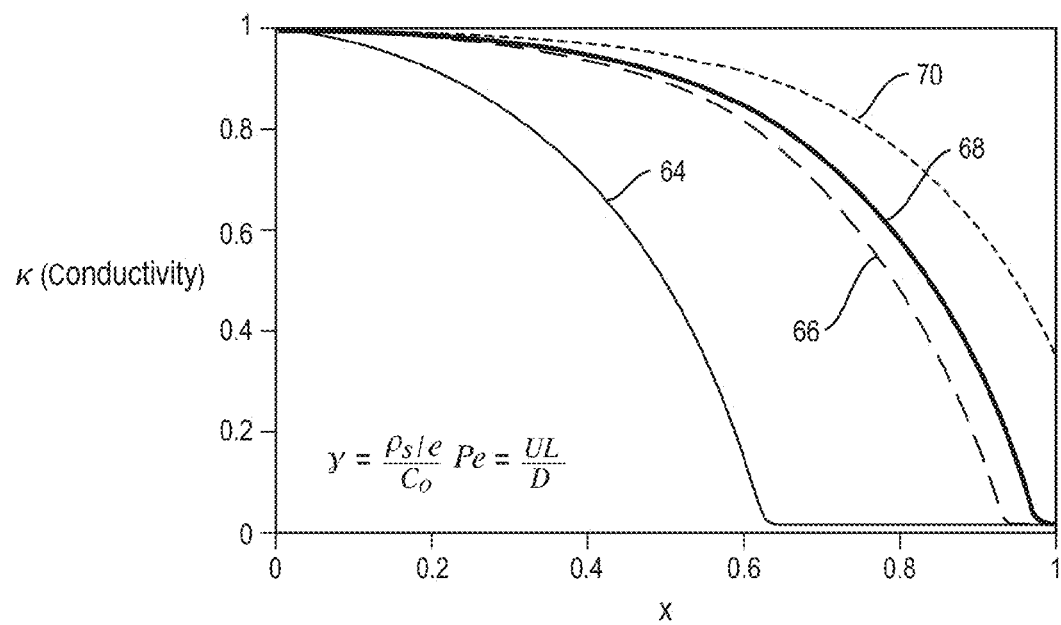
FIGS. 31 and 32 show simulated data for the bulk conductivity profile in a nano/micro pore.
Figure 32:
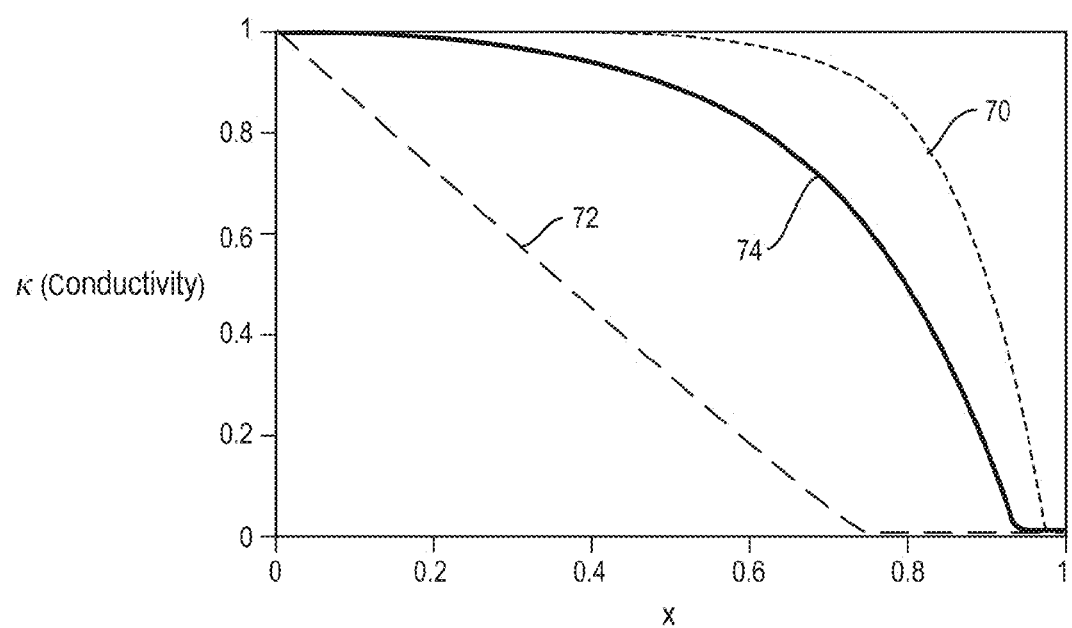

Numerical simulations based on this theory are presented, as follows. The plot in FIG. 31 shows how the conductivity profile, which is proportional to charge concentration, changes as higher voltages are applied between the two electrodes for a constant Peclet (Pe) number; the chart shows plots for the following voltages: 5.0 volts (plot 64), 1.0 volts (plot 66), 0.5 volts (plot 68), and 0.1 volts (plot 70). A potential is applied at x=1, and the cation species are consumed at a rate proportional to the resulting current. After the applied voltage reaches a critical value, a depleted region develops and grows with higher voltages. The plots in both FIGS. 31 and 32 are for a fixed surface charge density to initial bulk concentration ratio, $\gamma$, set to $10^{-2}$. FIG. 32 shows the conductivity profile for Pe values of 0 (plot 72), 5 (plot 74), and 10 (plot 76), where voltage remains constant, though flow rate is varied. As the dimensionless velocity, Pe, increases, the depleted region contracts toward the membrane. If the flow rate continues to increase, the depleted region will disappear altogether.

Figure 33:
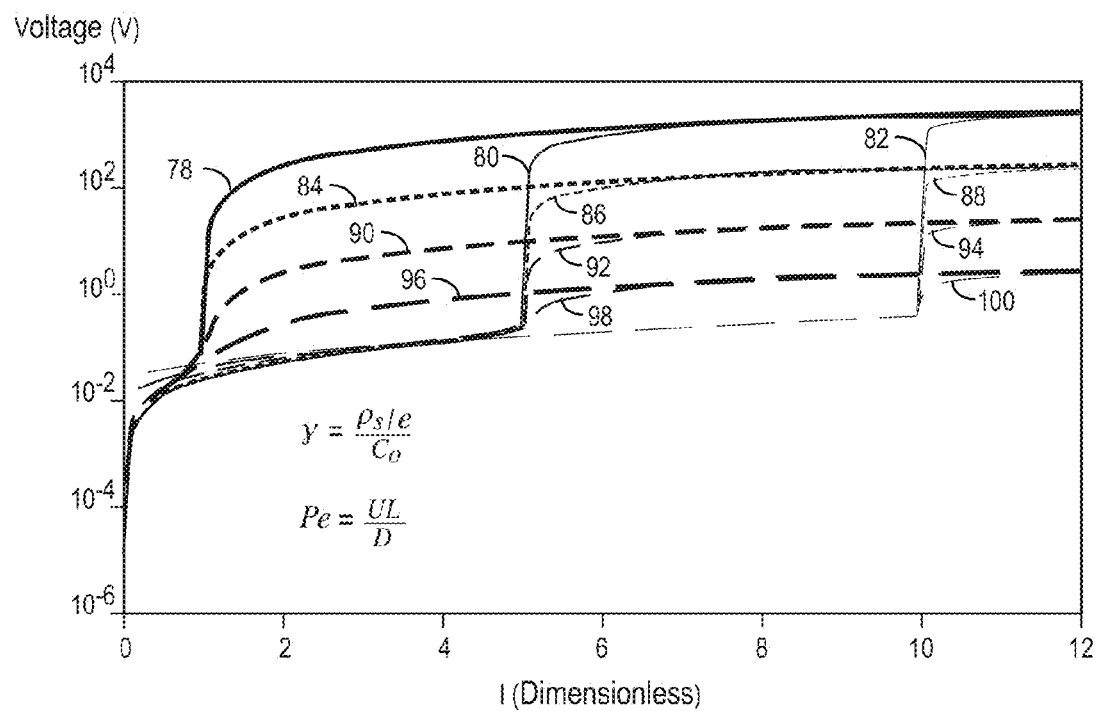
FIG. 33 shows simulated V-I curves for varying surface charge densities and Peclet numbers for the system represented in FIGS. 31 and 32.

Classically, when super-limiting currents are applied, the resulting voltage will increase towards infinity as the system tries to satisfy the applied boundary condition. However, based on this theory, under the right conditions, the applied voltage will level off to a stable, steady-state value, as seen in FIG. 33. This figure includes V-I curves for varying surface charge densities ( ) and Pe numbers. Specifically, surface charge densities (and Peclet numbers are plotted as follows:

=0.0001 and Pe=0 (plot 78), =0.0001 and Pe=5 (plot 80), and =0.0001 and Pe=10 (plot 82),
=0.001 and Pe=0 (plot 84), =0.001 and Pe=5 (plot 86), and =0.001 and Pe=10 (plot 88),
=0.01 and Pe=0 (plot 90), =0.01 and Pe=5 (plot 92), and =0.01 and Pe=10 (plot 94),
=0.1 and Pe=0 (plot 96), =0.1 and Pe=5 (plot 98), and =0.1 and Pe=10 (plot 100).

The jump in voltage corresponds to a depletion region developing. As Pe increases, the overall behavior remains the same; but the location of the "jump" (i.e., a voltage plateau) occurs at higher currents. As surface charge, decreases, the system approaches the classic case of diffusion-limited current, where the voltage goes to infinity.

Figure 34:
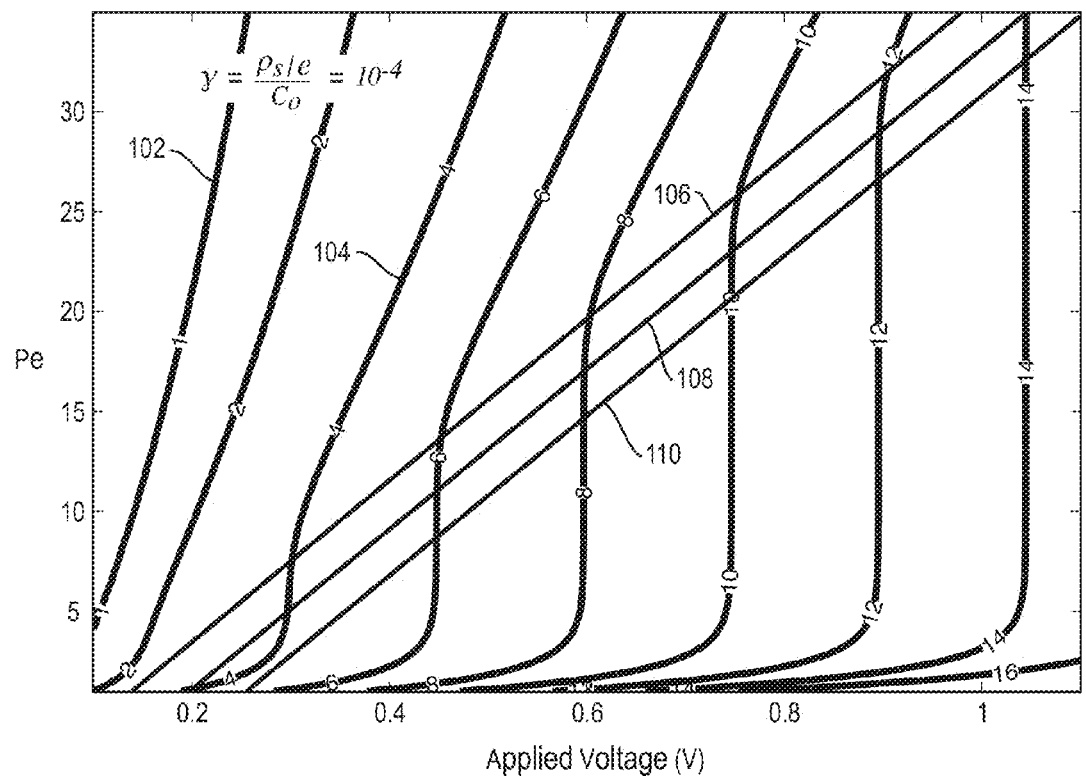
FIG. 34 shows energy/volume calculations for the system represented in FIGS. 31 and 32 for desalination of seawater (0.5 M).
Figure 35:
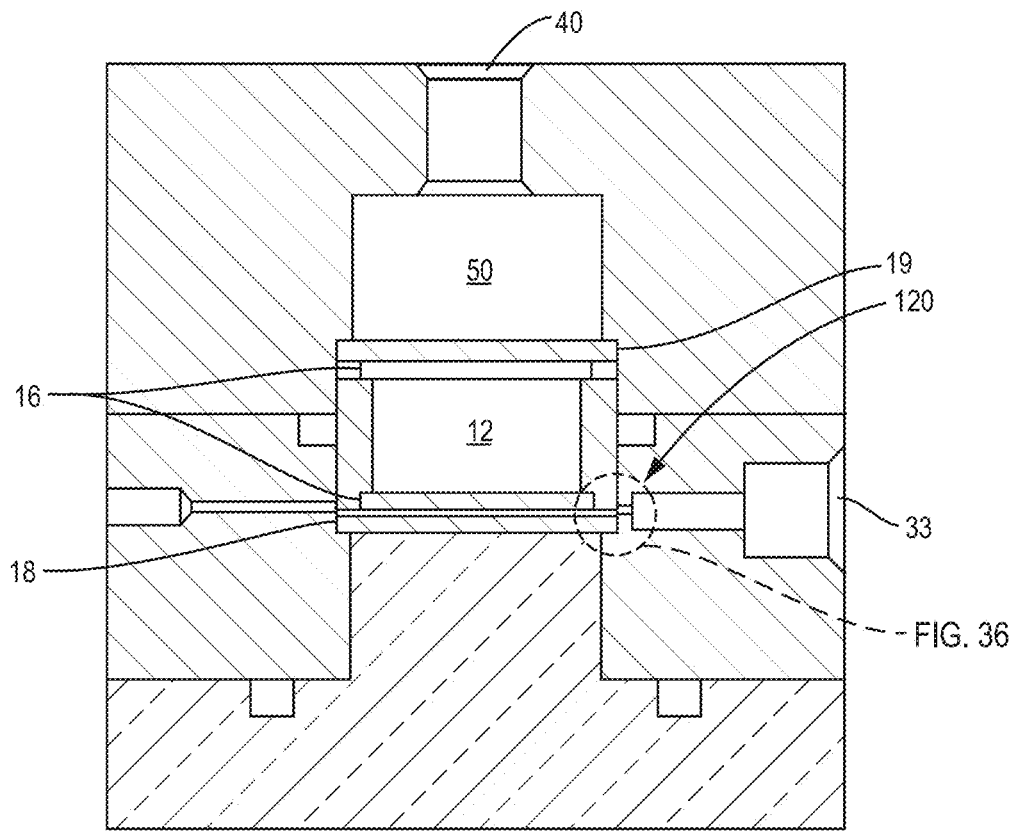
FIG. 35 is a sectional view of a shock-membrane prototype for $CuSO_4$ "desalination."
Figure 36:
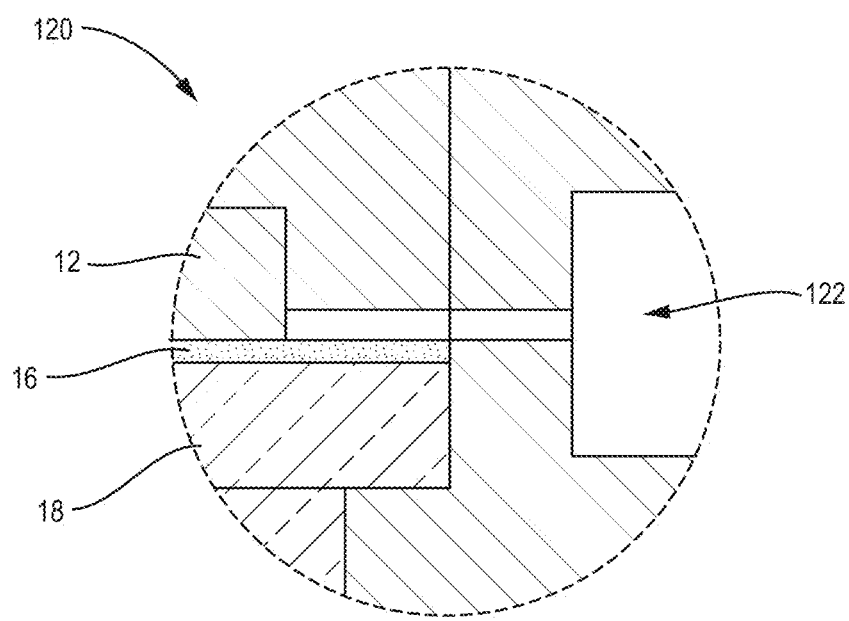
FIG. 36 is a magnified view of a section from FIG. 35.

With the development of steady-state depletion regions, where the depleted region represents desalinated water, this method may be used for desalination. To evaluate the viability of this method for water desalination, the energy/volume of a sample system was considered. A simple one-dimensional model was used to predict the energy efficiency (contour lines) of purification via a shock membrane for seawater desalination for different applied voltages at different flow rates, or Peclet numbers, UL/D. In FIG. 34, energy/volume is plotted under varying conditions for 0.5M saltwater. The theoretical energy/volume limit is 1 kWh/m³ and is represented by the left-most line 102. Line 104 is the contour of 4 kWhr/m³, which is the best case scenario for reverse osmosis. The straight, angled lines are contours of the degree of depletion at the end of the channel, where the lines represent from 1% depleted (line 106), 0.1% depleted (line 108), and 0.01% depleted (line 110). In order to achieve higher depletion, higher voltages or lower velocities can be employed. These lines, in conjunction with the physical limit of about 1V (in water), demonstrate some of the design constraints for this problem. While this method could compete with reverse osmosis at low flow rates, it may also be beneficial to create a small, portable system with higher water production for a slightly higher energy cost.

The larger the surface charge ( ) on the porous material is, the stronger the nonlinear force will be, resulting in higher currents at lower voltages. In FIG. 33, the voltage vs. current curves increase sharply as the system approaches depletion (around I=1 for Pe=0), and then the slope decreases corresponding to the depleted region. The value of the voltages in the depleted region can change over orders of magnitude depending on the surface charge. As a result, it is advantageous to use a porous material with a high surface charge.

Additionally, under optimal conditions, a desalination system would not be run with large depletion regions. It is more efficient (see FIG. 34) to operate under the lowest voltages possible. Therefore, the system can be optimized so that the depletion region is as small as possible while still maintaining good water recovery by balancing flow rate and applied voltage. Increasing the flow rate improves efficiency and decreases the depleted region (see FIGS. 31 and 32), making water recovery difficult. Increasing the applied voltage increases the depletion region but decreases the efficiency. Consequently, optimization of water production and efficiency may depend on these factors.

Though water desalination and purification have been specifically discussed, the systems and methods can likewise be used with other liquids in other contexts, such as for the segregation of surfactant-stabilized colloids or inverse micelles in a non-polar solvent, where an electrode is substituted for the membrane. For example, electrophoretic displays, such as the displays produced by E-Ink (Cambridge, Mass.) for the Amazon Kindle electronic reader include black and white, oppositely charged colloidal particles suspended in a liquid near a transparent electrode. When a voltage is applied, black or white particles crowd on the electrodes and change the color of the "pixel." The pixel is a set of oil droplets squashed between parallel plate electrodes. Accordingly, the electrolyte in this embodiment is a non-aqueous, non-polar solvent. The charged particles can be either surfactant-stabilized colloids, which would not dissolve in oil without the surfactant molecules, or inverse micelles (i.e., clumps of surfactants). In this context, the system can be used to reduce/control the concentration of charged particles in a controlled way, in a large-scale continuous process, e.g., in the production of electronic inks.

In another embodiment, the methods and apparatus of the invention can be used to continuously produce an outlet stream of increased concentration of dissolved salts or small, charged impurities, such as nanoparticles, quantum dots, colloidal particles, organic molecules, minerals, biological molecules, small proteins, DNA, microorganisms, cells, and viruses. The higher concentration of salt or impurities can be used to enhance the sensitivity (signal to noise ratio) of detection methods downstream of the device. The same method and apparatus can also be used to continuously increase the concentration of charged particles in chemical mixtures, colloids, electrolytes, acids, etc., in applications such as water softening, food processing, and chemical production.

In another embodiment, the methods and apparatus of the invention can be used in conjunction with an electrodeposition/dissolution cell, where the ion-selective surfaces are electrodes rather than ion-exchange membranes. For example, the electrolyte can be an aqueous solution of cupric chloride ($CuCl_2$), and the cation-exchange membrane can be replaced by a metallic copper cathode, polarized by an applied voltage to deposit copper from solution ($Cu^{+2}+2 e^- \rightarrow Cu$). The anode can also be made of copper, and the reverse reaction (dissolution) will occur in response to the voltage to produce cupric ions. In this situation, a cationic porous medium placed in contact with the cathode will lead to the formation of desalination shocks and allow the passage of over-limiting (or super-limiting) current. This system will also deplete the salt concentration and remove impurities from the region between the shock and the electrode. The same procedure can be applied to any electrochemical cell, wherein electrodes act as ion-selective surfaces depleting the local salt concentration.

In other embodiments, the methods and apparatus can be used for disinfection. The electric fields can be very large near the shock region 28 where water is extracted. Most biological impurities have negative charge in water and will be rejected by charge and by size from a cationic porous medium 12. Accordingly, biological organisms can be removed from the liquid stream using this apparatus and methods. Likewise, other contaminants, such as heavy ions, can be removed from a liquid stream using the apparatus and methods.

Experimental:

Our basic strategy to extract pure water behind desalination shocks is illustrated in FIGS. 30 and 35-37, along with the first experimental prototype. The experimental setup, as shown in the schematic illustration of FIG. 30, includes a sandwich structure of a 1-mm-thick, 1-cm-radius porous silica glass frit 12 (commercially available with submicron pores—in this case, with pore widths ranging from 50 nm to 1 micron) against a NAFION membrane 16, supported by a plastic mesh with solution reservoirs 50 leading to metal electrodes on either side. The frit/membrane assembly is packed in a hard plastic with screws to form tight seals at the outer edges. Fresh water 32 is continuously extracted from the depleted zone 30 within the glass frit 12, which passes over-limiting current through the NAFION membrane 16. Brine 42 and 46 is produced in the anode and cathode compartments 50 and removed by a slow pressure-driven flow. A cross-sectional CAD drawing of the structure is provided in FIGS. 35 and 36.

For continuous water extraction, a ~100-micron-thick circular orifice on the frit side wall up to the membrane interface leads to an O-ring channel where fresh water collects before it proceeds through an outlet valve 33. The outlet flow 32 can be precisely controlled by a syringe pump with velocity precision down to microns/sec, although eventually the device may operate using spontaneously generated electro-osmotic flows in the glass frit 12, without needing any externally applied pressure. Solution conductivities in different locations are measured by impedance spectroscopy, either by extracting a sample into a capillary with electrode caps, or by making electrical measurements with in situ electrodes. pH levels will also be monitored.

Figure 37:
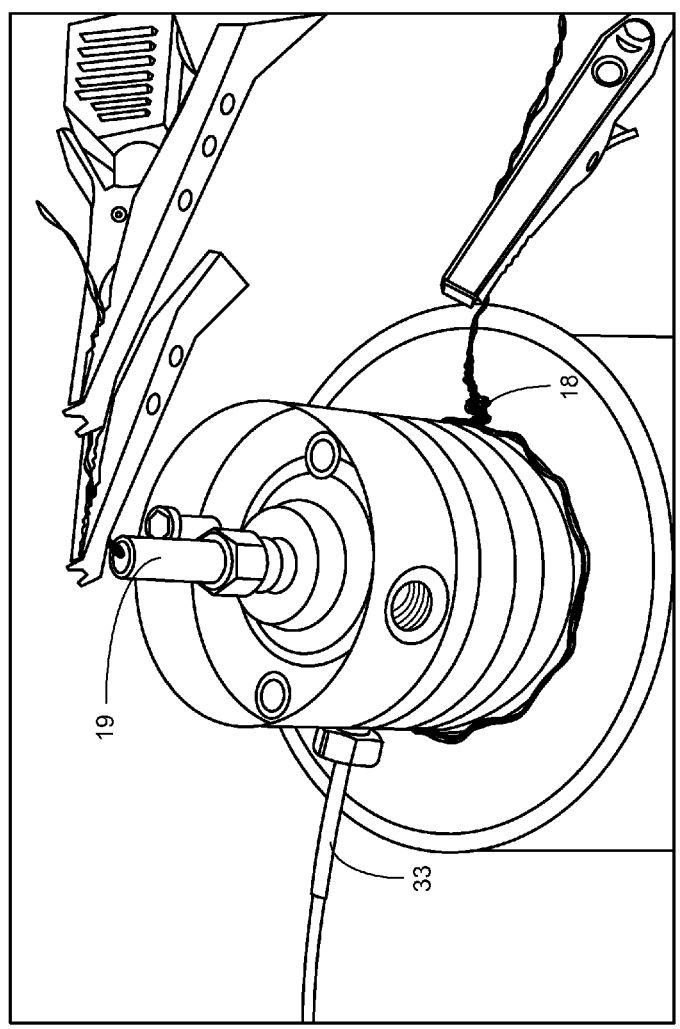
FIG. 37 is a photographic image of the shock-membrane prototype in operation.

As a model system with simple chemistry, a prototype apparatus, shown in FIG. 37, was used in first experiments involving aqueous copper sulfate solutions with copper electrodes 18 and 19 undergoing deposition/dissolution reactions. In that case, the copper cathode 18 is in direct contact with the membrane/frit assembly, and we find that uniform deposition occurs without forming dendrites up to several volts. The anode 19 is a copper ring on the other side of the anodic reservoir feeding the glass frit from the back. In a more general setup, the electrodes are separated from the reservoirs and catalyze water electrolysis reactions away from the membrane, as in electrodialysis systems.

Figure 38:
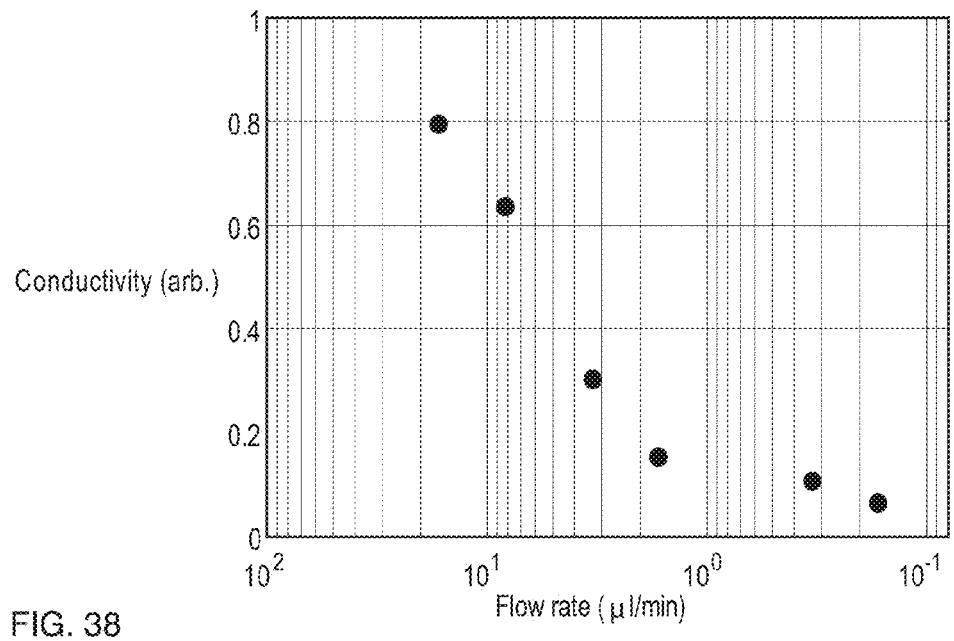
FIG. 38 plots the first experimental results for the shock-membrane prototype of FIG. 37 for continuous $CuSO_4$ desalination.
Figure 39:
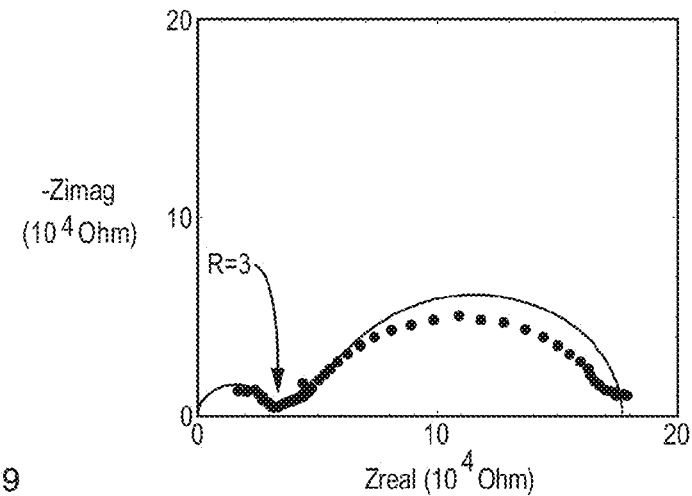
FIG. 39 plots the impedance spectra for the initial solution used in the experiment for which the results are plotted in FIG. 38.
Figure 40:
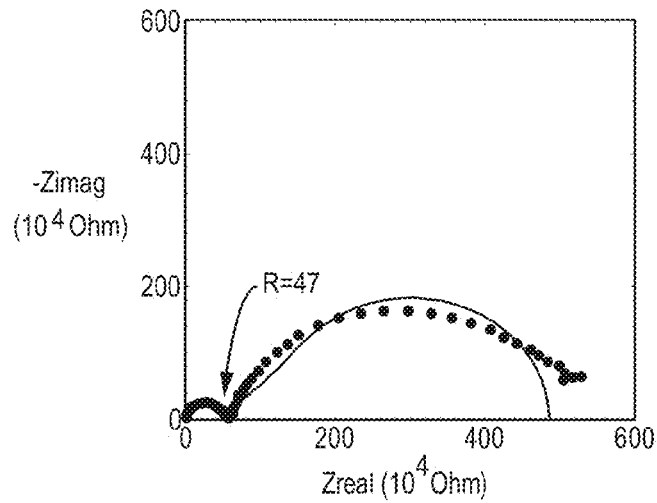
FIG. 40 plots the impedance spectra for the extracted solution used in the experiment for which the results are plotted in FIG. 38.

The preliminary copper sulfate results in FIGS. 38-40 are promising and show good agreement with our theoretical predictions. The observed current-voltage relation in steady state with zero net fluid flow fit our analytical formula, thus supporting the hypothesis of over-limiting current carried by surface conduction in our submicron channels. This is already an important result, since we have demonstrated over-limiting current by a new mechanism in a nano-porous medium where convection is suppressed.

Our first proof-of-concept desalination experiment to extract water from copper sulfate solution in the frit was also successful, using only 1.5 Volts. A simple measure of the energy efficiency from the data yields the following: energy/volume=power/flow rate=(2 mA*1.5V)/(2 µL/min)=23 kWh/m$^3$, which is satisfactory considering that the process had not yet been optimized.

The data from our first attempt at continuous desalination of "brackish copper sulfate" (100 mM) is shown in FIG. 38, showing the conductivity decrease by up to a factor of 20 at low flow rates (down to "potable" levels) in a device with a 500 micron gap on a 1 mm glass frit. Using a smaller gap should dramatically improve the energy efficiency and concentration reduction. FIGS. 39 and 40 plot the impedance spectra for the input and output solutions, respectively via copper probe electrodes showing the increase in bulk resistance before and after passing through the device, indicating strong depletion of the mobile ions.

In this first device, the outlet gap of 500 microns (half of the frit thickness of 1 mm) was overly wide, thereby allowing much of the concentrated diffusion layer to exit the frit along with the depleted zone. As a result, the salt (copper sulfate) concentration was only reduced by a factor of 20 from brackish levels (100 mM) to potable levels (<10 mM), but we expect better results from a planned device with a 100 micron gap. The theory predicts that the depleted zone will reach a salt concentration comparable to the number of surface charges per volume in the porous medium, which is <0.1mM.

A simple conservation analysis for thin desalination shocks gives an ultimate efficiency of $E/V=P/Q \approx t\_c_0 eV$, where $t\_$ is the co-ion transference number, $c_0$ the salt concentration, and V the applied voltage. For small applied voltages, near the thermal voltage V=25 mV, the predicted energy density of shock-membrane purification approaches the thermodynamic lower bound, set by the osmotic pressure (0.7 kWh/m$^3$ for seawater). In this limit, however, the shock width becomes comparable to the depletion zone width, which interferes with the recovery of the fresh water, due to excessive mixing of the fresh and salty regions, which makes sense, since we cannot beat thermodynamics. Careful engineering of this system, however, will help to optimize the trade-off between efficiency, flow rate, and water recovery, and reach useful performance metrics for applications.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A desalination and purification system for a source liquid containing co-ions and counter-ions selected from dissolved ions, charged impurities, charged droplets and combinations thereof, wherein the co-ions and counter-ions have charges of opposite signs, the system comprising:
   a conduit for liquid flow including a liquid inlet port, a desalinated/purified liquid outlet port, and a waste liquid outlet port;
   a first electrode;
   a second electrode and ion-selective boundary configuration selected from:
   a) a second electrode and at least one distinct ion-selective boundary, and
   b) a second electrode that also serves as the ion-selective boundary, wherein the electrodes are configured to drive ionic current in the source liquid when the source liquid fills the conduit and to produce brine/waste liquid from the source liquid, and wherein the ion-selective boundary is configured to conduct the ionic current and selectively transmit or remove the counter-ions and block the co-ions from the source liquid; and
   at least one porous medium, wherein in configuration "a" the porous medium is on an opposite side of the ion-selective boundary from the second electrode, wherein the porous medium has a surface charge with a sign that is the same as the sign of the co-ions to enable conduction of an additional ionic current via the counter-ions and consequent production of a region of desalinated/purified liquid, wherein the desalinated/purified liquid outlet port is positioned to extract the desalinated/purified liquid from the porous medium, wherein no membrane is positioned in the porous medium to create a separation of liquid flow paths from the liquid inlet port between (i) the desalinated/purified liquid outlet port and (ii) the waste liquid outlet port.

2. The desalination and purification system of claim 1, wherein the source liquid is coupled in fluid communication with the liquid inlet port and comprises water that contains dissolved salts and at least one of the following: suspended particles and suspended droplets.

3. The desalination and purification system of claim 2, wherein the desalinated/purified liquid outlet port contains desalinated/purified liquid, and wherein the waste liquid outlet port contains waste liquid.

4. The desalination and purification system of claim 1, wherein only one ion-selective boundary is included in the system, and wherein the ion-selective boundary separates only one electrode from the liquid inlet port.

5. The desalination and purification system of claim 1, wherein channels defined by the porous medium have a mean diameter of at least about 10 nm.

6. The desalination and purification system of claim 1, wherein the porous medium is selected from porous glass, porous ceramic, porous metal oxide, porous polymer, porous functionalized polymer, porous cross-linked polymer, and porous zeolite materials.

7. The desalination and purification system of claim 1, where the porous medium is an array of channels fabricated in silica glass, silicon, or a polymeric material.

8. The desalination and purification system of claim 1, wherein the porous medium is a packed bed of particles having diameters of about 100 microns or less.

9. The desalination and purification system of claim 1, wherein the porous medium has at least one of
   (a) non-uniform porosity,
   (b) non-uniform surface charge, and
   (c) non-uniform microstructure
when viewed across a distance at least an order of magnitude greater than an average diameter of the pore channels in the porous medium to generate non-uniform liquid flow or control of the salt concentration profile across different regions of the system.

10. The desalination and purification system of claim 1, where one or both electrodes are also porous.

11. The desalination and purification system of claim 1, wherein the ion-selective boundary and porous medium are selected from at least one of the following: (a) a cation exchange membrane positioned between the second electrode and the porous medium, wherein the second electrode is a cathode, and wherein the porous medium has a negative surface charge and (b) an anion exchange membrane positioned between the second electrode and the porous medium, wherein the second electrode is an anode, and wherein the porous medium has a positive surface charge.

12. The desalination and purification system of claim 11, wherein the membrane and the porous medium comprise a first layer in an alternating sequence of at least two stacked layers of membranes and porous media with internal charge of the same sign, terminating with another ion-selective boundary of the same internal charge sign as the internal charge of the membranes and porous media, placed in between the two electrodes, wherein each layer includes a respective liquid inlet port, desalinated/purified liquid outlet port and waste liquid outlet port, and wherein no membrane is positioned in the porous medium in any of the layers to create a separation of liquid flow paths from the liquid inlet port between (i) the desalinated/purified liquid outlet port and (ii) the waste liquid outlet port.

13. The desalination and purification system of claim 11, wherein the second electrode is porous and the ion-exchange membrane is connected to the second electrode in a membrane-electrode assembly.

14. The desalination and purification system of claim 1, wherein the ion-selective surface is also the second electrode and selectively removes counter-ions either by capacitive charging of the double layers or by electrochemical reactions.

15. The desalination and purification system of claim 1, wherein the porous medium has non-uniform pores, including at least one of the following: graded pore structure, discontinuous changes in pore structure, or pores ranging in size by a factor of at least five.

16. The desalination and purification system of claim 1, wherein the porous medium is an agglomerate of different porous materials.

* * * * *